US008208973B2

(12) United States Patent
Mehta

(10) Patent No.: US 8,208,973 B2
(45) Date of Patent: Jun. 26, 2012

(54) SYSTEM AND METHOD FOR VARIABLE BEACON TIMING WITH WIRELESS DEVICES

(75) Inventor: Kaezad J. Mehta, Chatsworth, CA (US)

(73) Assignee: Medtronic Minimed, Inc., Northridge, CA (US)

( * ) Notice: Subject to any disclaimer, the term of this patent is extended or adjusted under 35 U.S.C. 154(b) by 823 days.

(21) Appl. No.: 12/265,673

(22) Filed: Nov. 5, 2008

(65) Prior Publication Data

US 2010/0111066 A1    May 6, 2010

(51) Int. Cl.
*H04M 1/00* (2006.01)
*H04B 1/16* (2006.01)
*H04B 1/04* (2006.01)
*H04B 7/185* (2006.01)
*G08B 5/22* (2006.01)
*H04Q 1/30* (2006.01)
*G08C 17/00* (2006.01)
*H04H 20/71* (2008.01)
*H04J 3/00* (2006.01)

(52) U.S. Cl. ............... 455/574; 455/127.5; 455/343.1; 455/343.2; 455/343.3; 455/343.4; 455/343.5; 455/343.6; 455/572; 455/573; 340/7.1; 340/7.32; 340/7.33; 340/7.34; 340/7.36; 370/345; 370/318; 370/312; 370/311

(58) Field of Classification Search ........... 455/343.1, 455/343.2, 343.3, 343.4, 343.5, 343.6, 127.5, 455/574, 573, 572, 522; 340/7.36, 7.34, 340/7.33, 7.32, 7.1; 370/345, 318, 312, 311
See application file for complete search history.

(56) References Cited

U.S. PATENT DOCUMENTS

| 3,631,847 A | 1/1972 | Hobbs, II |
| 4,212,738 A | 7/1980 | Henne |

(Continued)

FOREIGN PATENT DOCUMENTS

DE    4329229    3/1995

(Continued)

OTHER PUBLICATIONS

PCT Search Report (PCT/US02/03299), Oct. 31, 2002, Medtronic Minimed, Inc.

(Continued)

*Primary Examiner* — Charles Appiah
*Assistant Examiner* — Christopher Kohlman
(74) *Attorney, Agent, or Firm* — Ingrassia Fisher & Lorenz, P.C.

(57) ABSTRACT

Systems and methods for supporting variable beacon timing for a first wireless device and a second wireless device are provided. An exemplary system may include a number of wireless devices configured to wirelessly communicate with one another. The system includes a beacon-transmitting wireless device and a listening wireless device. The beacon-transmitting wireless device is configured to transmit, during a first operating mode, wireless beacons separated in time by relatively long time intervals. The beacon-transmitting device is also configured to transmit, during a second operating mode, wireless beacons separated in time by relatively short time intervals. The listening wireless device is configured to listen, during the first operating mode, for wireless beacons transmitted by the beacon-transmitting wireless device, and is configured to listen, during the second operating mode, for wireless beacons transmitted by the beacon-transmitting wireless device. The system may have more than two different operating modes, which may be desirable if the number of wireless devices in the system exceeds two.

17 Claims, 5 Drawing Sheets

U.S. PATENT DOCUMENTS

| | | | |
|---|---|---|---|
| 4,270,532 A | 6/1981 | Franetzki et al. |
| 4,282,872 A | 8/1981 | Franetzki et al. |
| 4,373,527 A | 2/1983 | Fischell |
| 4,395,259 A | 7/1983 | Prestele et al. |
| 4,433,072 A | 2/1984 | Pusineri et al. |
| 4,443,218 A | 4/1984 | DeCant, Jr. et al. |
| 4,494,950 A | 1/1985 | Fischell |
| 4,542,532 A | 9/1985 | McQuilkin |
| 4,550,731 A | 11/1985 | Batina et al. |
| 4,559,037 A | 12/1985 | Franetzki et al. |
| 4,562,751 A | 1/1986 | Nason et al. |
| 4,671,288 A | 6/1987 | Gough |
| 4,678,408 A | 7/1987 | Nason et al. |
| 4,685,903 A | 8/1987 | Cable et al. |
| 4,731,051 A | 3/1988 | Fischell |
| 4,731,726 A | 3/1988 | Allen, III |
| 4,781,798 A | 11/1988 | Gough |
| 4,803,625 A | 2/1989 | Fu et al. |
| 4,809,697 A | 3/1989 | Causey, III et al. |
| 4,826,810 A | 5/1989 | Aoki |
| 4,871,351 A | 10/1989 | Feingold |
| 4,898,578 A | 2/1990 | Rubalcaba, Jr. |
| 5,003,298 A | 3/1991 | Havel |
| 5,011,468 A | 4/1991 | Lundquist et al. |
| 5,019,974 A | 5/1991 | Beckers |
| 5,050,612 A | 9/1991 | Matsumura |
| 5,078,683 A | 1/1992 | Sancoff et al. |
| 5,080,653 A | 1/1992 | Voss et al. |
| 5,097,122 A | 3/1992 | Colman et al. |
| 5,100,380 A | 3/1992 | Epstein et al. |
| 5,101,814 A | 4/1992 | Palti |
| 5,108,819 A | 4/1992 | Heller et al. |
| 5,153,827 A | 10/1992 | Coutre et al. |
| 5,165,407 A | 11/1992 | Wilson et al. |
| 5,247,434 A | 9/1993 | Peterson et al. |
| 5,262,035 A | 11/1993 | Gregg et al. |
| 5,262,305 A | 11/1993 | Heller et al. |
| 5,264,104 A | 11/1993 | Gregg et al. |
| 5,264,105 A | 11/1993 | Gregg et al. |
| 5,284,140 A | 2/1994 | Allen et al. |
| 5,299,571 A | 4/1994 | Mastrototaro |
| 5,307,263 A | 4/1994 | Brown |
| 5,317,506 A | 5/1994 | Coutre et al. |
| 5,320,725 A | 6/1994 | Gregg et al. |
| 5,322,063 A | 6/1994 | Allen et al. |
| 5,338,157 A | 8/1994 | Blomquist |
| 5,339,821 A | 8/1994 | Fujimoto |
| 5,341,291 A | 8/1994 | Roizen et al. |
| 5,350,411 A | 9/1994 | Ryan et al. |
| 5,356,786 A | 10/1994 | Heller et al. |
| 5,357,427 A | 10/1994 | Langen et al. |
| 5,368,562 A | 11/1994 | Blomquist et al. |
| 5,370,622 A | 12/1994 | Livingston et al. |
| 5,371,687 A | 12/1994 | Holmes, II et al. |
| 5,376,070 A | 12/1994 | Purvis et al. |
| 5,390,671 A | 2/1995 | Lord et al. |
| 5,391,250 A | 2/1995 | Cheney, II et al. |
| 5,403,700 A | 4/1995 | Heller et al. |
| 5,411,647 A | 5/1995 | Johnson et al. |
| 5,482,473 A | 1/1996 | Lord et al. |
| 5,485,408 A | 1/1996 | Blomquist |
| 5,497,772 A | 3/1996 | Schulman et al. |
| 5,505,709 A | 4/1996 | Funderburk et al. |
| 5,543,326 A | 8/1996 | Heller et al. |
| 5,569,186 A | 10/1996 | Lord et al. |
| 5,569,187 A | 10/1996 | Kaiser |
| 5,573,506 A | 11/1996 | Vasko |
| 5,582,593 A | 12/1996 | Hultman |
| 5,586,553 A | 12/1996 | Halili et al. |
| 5,593,390 A | 1/1997 | Castellano et al. |
| 5,593,852 A | 1/1997 | Heller et al. |
| 5,594,638 A | 1/1997 | Illiff |
| 5,609,060 A | 3/1997 | Dent |
| 5,626,144 A | 5/1997 | Tacklind et al. |
| 5,630,710 A | 5/1997 | Tune et al. |
| 5,643,212 A | 7/1997 | Coutre et al. |
| 5,660,163 A | 8/1997 | Schulman et al. |
| 5,660,176 A | 8/1997 | Iliff |
| 5,665,065 A | 9/1997 | Colman et al. |
| 5,665,222 A | 9/1997 | Heller et al. |
| 5,685,844 A | 11/1997 | Marttila |
| 5,687,734 A | 11/1997 | Dempsey et al. |
| 5,704,366 A | 1/1998 | Tacklind et al. |
| 5,750,926 A | 5/1998 | Schulman et al. |
| 5,764,159 A | 6/1998 | Neftel |
| 5,772,635 A | 6/1998 | Dastur et al. |
| 5,779,665 A | 7/1998 | Mastrototaro et al. |
| 5,788,669 A | 8/1998 | Peterson |
| 5,791,344 A | 8/1998 | Schulman et al. |
| 5,800,420 A | 9/1998 | Gross et al. |
| 5,807,336 A | 9/1998 | Russo et al. |
| 5,814,015 A | 9/1998 | Gargano et al. |
| 5,822,715 A | 10/1998 | Worthington et al. |
| 5,832,448 A | 11/1998 | Brown |
| 5,840,020 A | 11/1998 | Heinonen et al. |
| 5,861,018 A | 1/1999 | Feierbach et al. |
| 5,868,669 A | 2/1999 | Iliff |
| 5,871,465 A | 2/1999 | Vasko |
| 5,879,163 A | 3/1999 | Brown et al. |
| 5,885,245 A | 3/1999 | Lynch et al. |
| 5,897,493 A | 4/1999 | Brown |
| 5,899,855 A | 5/1999 | Brown |
| 5,904,708 A | 5/1999 | Goedeke |
| 5,913,310 A | 6/1999 | Brown |
| 5,917,346 A | 6/1999 | Gord |
| 5,918,603 A | 7/1999 | Brown |
| 5,925,021 A | 7/1999 | Castellano et al. |
| 5,933,136 A | 8/1999 | Brown |
| 5,935,099 A | 8/1999 | Peterson et al. |
| 5,940,801 A | 8/1999 | Brown |
| 5,956,501 A | 9/1999 | Brown |
| 5,960,403 A | 9/1999 | Brown |
| 5,965,380 A | 10/1999 | Heller et al. |
| 5,972,199 A | 10/1999 | Heller et al. |
| 5,978,236 A | 11/1999 | Faberman et al. |
| 5,997,476 A | 12/1999 | Brown |
| 5,999,848 A | 12/1999 | Gord et al. |
| 5,999,849 A | 12/1999 | Gord et al. |
| 6,009,339 A | 12/1999 | Bentsen et al. |
| 6,032,119 A | 2/2000 | Brown et al. |
| 6,043,437 A | 3/2000 | Schulman et al. |
| 6,081,736 A | 6/2000 | Colvin et al. |
| 6,083,710 A | 7/2000 | Heller et al. |
| 6,088,608 A | 7/2000 | Schulman et al. |
| 6,101,478 A | 8/2000 | Brown |
| 6,103,033 A | 8/2000 | Say et al. |
| 6,119,028 A | 9/2000 | Schulman et al. |
| 6,120,676 A | 9/2000 | Heller et al. |
| 6,121,009 A | 9/2000 | Heller et al. |
| 6,134,461 A | 10/2000 | Say et al. |
| 6,143,164 A | 11/2000 | Heller et al. |
| 6,162,611 A | 12/2000 | Heller et al. |
| 6,175,752 B1 | 1/2001 | Say et al. |
| 6,183,412 B1 | 2/2001 | Benkowski et al. |
| 6,246,992 B1 | 6/2001 | Brown |
| 6,259,937 B1 | 7/2001 | Schulman et al. |
| 6,329,161 B1 | 12/2001 | Heller et al. |
| 6,408,330 B1 | 6/2002 | DeLaHuerga |
| 6,424,847 B1 | 7/2002 | Mastrototaro et al. |
| 6,472,122 B1 | 10/2002 | Schulman et al. |
| 6,484,045 B1 | 11/2002 | Holker et al. |
| 6,484,046 B1 | 11/2002 | Say et al. |
| 6,503,381 B1 | 1/2003 | Gotoh et al. |
| 6,514,718 B2 | 2/2003 | Heller et al. |
| 6,553,263 B1 | 4/2003 | Meadows et al. |
| 6,554,798 B1 | 4/2003 | Mann et al. |
| 6,558,320 B1 | 5/2003 | Causey, III et al. |
| 6,558,351 B1 | 5/2003 | Steil et al. |
| 6,560,741 B1 | 5/2003 | Gerety et al. |
| 6,565,509 B1 | 5/2003 | Say et al. |
| 6,579,690 B1 | 6/2003 | Bonnecaze et al. |
| 6,591,125 B1 | 7/2003 | Buse et al. |
| 6,592,745 B1 | 7/2003 | Feldman et al. |
| 6,605,200 B1 | 8/2003 | Mao et al. |
| 6,605,201 B1 | 8/2003 | Mao et al. |
| 6,607,658 B1 | 8/2003 | Heller et al. |
| 6,616,819 B1 | 9/2003 | Liamos et al. |

| | | | |
|---|---|---|---|
| 6,618,934 | B1 | 9/2003 | Feldman et al. |
| 6,623,501 | B2 | 9/2003 | Heller et al. |
| 6,641,533 | B2 | 11/2003 | Causey, III et al. |
| 6,654,625 | B1 | 11/2003 | Say et al. |
| 6,659,980 | B2 | 12/2003 | Moberg et al. |
| 6,671,554 | B2 | 12/2003 | Gibson et al. |
| 6,676,816 | B2 | 1/2004 | Mao et al. |
| 6,689,265 | B2 | 2/2004 | Heller et al. |
| 6,733,471 | B1 | 5/2004 | Ericson et al. |
| 6,746,582 | B2 | 6/2004 | Heller et al. |
| 6,749,740 | B2 | 6/2004 | Liamos et al. |
| 6,752,787 | B1 | 6/2004 | Causey, III et al. |
| 6,809,653 | B1 | 10/2004 | Mann et al. |
| 6,817,990 | B2 | 11/2004 | Yap et al. |
| 6,881,551 | B2 | 4/2005 | Heller et al. |
| 6,892,085 | B2 | 5/2005 | McIvor et al. |
| 6,893,545 | B2 | 5/2005 | Gotoh et al. |
| 6,895,263 | B2 | 5/2005 | Shin et al. |
| 6,916,159 | B2 | 7/2005 | Rush et al. |
| 6,932,584 | B2 | 8/2005 | Gray et al. |
| 6,932,894 | B2 | 8/2005 | Mao et al. |
| 6,942,518 | B2 | 9/2005 | Liamos et al. |
| 2002/0082665 | A1 | 6/2002 | Haller et al. |
| 2002/0137997 | A1 | 9/2002 | Mastrototaro et al. |
| 2002/0161288 | A1 | 10/2002 | Shin et al. |
| 2003/0060765 | A1 | 3/2003 | Campbell et al. |
| 2003/0078560 | A1 | 4/2003 | Miller et al. |
| 2003/0088166 | A1 | 5/2003 | Say et al. |
| 2003/0144581 | A1 | 7/2003 | Conn et al. |
| 2003/0152823 | A1 | 8/2003 | Heller |
| 2003/0176183 | A1 | 9/2003 | Drucker et al. |
| 2003/0188427 | A1 | 10/2003 | Say et al. |
| 2003/0199744 | A1 | 10/2003 | Buse et al. |
| 2003/0220552 | A1 | 11/2003 | Reghabi et al. |
| 2004/0061232 | A1 | 4/2004 | Shah et al. |
| 2004/0061234 | A1 | 4/2004 | Shah et al. |
| 2004/0064133 | A1 | 4/2004 | Miller et al. |
| 2004/0064156 | A1 | 4/2004 | Shah et al. |
| 2004/0073095 | A1 | 4/2004 | Causey, III et al. |
| 2004/0074785 | A1 | 4/2004 | Holker et al. |
| 2004/0093167 | A1 | 5/2004 | Braig et al. |
| 2004/0111017 | A1 | 6/2004 | Say et al. |
| 2004/0259542 | A1* | 12/2004 | Viitamaki et al. ......... 455/426.2 |
| 2005/0038331 | A1 | 2/2005 | Silaski et al. |
| 2005/0143145 | A1* | 6/2005 | Maekawa ...................... 455/574 |
| 2005/0192557 | A1 | 9/2005 | Brauker et al. |
| 2006/0229694 | A1 | 10/2006 | Schulman et al. |
| 2009/0040954 | A1* | 2/2009 | Usuba ........................... 370/311 |

FOREIGN PATENT DOCUMENTS

| | | |
|---|---|---|
| EP | 0319268 | 11/1988 |
| EP | 0806738 | 11/1997 |
| EP | 0880936 | 12/1998 |
| EP | 1338295 | 8/2003 |
| GB | 2218831 | 11/1989 |
| WO | WO 96/20745 | 7/1996 |
| WO | WO 96/36389 | 11/1996 |
| WO | WO 96/37246 A1 | 11/1996 |
| WO | WO 97/21456 | 6/1997 |
| WO | WO 98/20439 | 5/1998 |
| WO | WO 98/24358 | 6/1998 |
| WO | WO 98/42407 | 10/1998 |
| WO | WO 98/49659 | 11/1998 |
| WO | WO 98/59487 | 12/1998 |
| WO | WO 99/08183 | 2/1999 |
| WO | WO 99/10801 | 3/1999 |
| WO | WO 99/18532 | 4/1999 |
| WO | WO 99/22236 | 5/1999 |
| WO | WO 00/10628 | 3/2000 |
| WO | WO 00/19887 | 4/2000 |
| WO | WO 00/48112 | 8/2000 |
| WO | WO 02/058537 A2 | 8/2002 |

OTHER PUBLICATIONS (Animas Corporation, 1999). Animas . . . bringing new life to insulin therapy.
Bode B W, et al. (1996). Reduction in Severe Hypoglycemia with Long-Term Continuous Subcutaneous Insulin Infusion in Type I Diabetes. Diabetes Care, vol. 19, No. 4, 324-327.
Boland E (1998). Teens Pumping it Up! Insulin Pump Therapy Guide for Adolescents. 2nd Edition.
Brackenridge B P (1992). Carbohydrate Gram Counting A Key to Accurate Mealtime Boluses in Intensive Diabetes Therapy. Practical Diabetology, vol. 11, No. 2, pp. 22-28.
Brackenridge, B P et al. (1995). Counting Carbohydrates How to Zero in on Good Control. MiniMed Technologies Inc.
Farkas-Hirsch R et al. (1994). Continuous Subcutaneous Insulin Infusion: A Review of the Past and Its Implementation for the Future. Diabetes Spectrum From Research to Practice, vol. 7, No. 2, pp. 80-84, 136-138.
Hirsch I B et al. (1990). Intensive Insulin Therapy for Treatment of Type I Diabetes. Diabetes Care, vol. 13, No. 12, pp. 1265-1283.
Kulkarni K et al. (1999). Carbohydrate Counting A Primer for Insulin Pump Users to Zero in on Good Control. MiniMed Inc.
Marcus A O et al. (1996). Insulin Pump Therapy Acceptable Alternative to Injection Therapy. Postgraduate Medicine, vol. 99, No. 3, pp. 125-142.
Reed J et al. (1996). Voice of the Diabetic, vol. 11, No. 3, pp. 1-38.
Skyler J S (1989). Continuous Subcutaneous Insulin Infusion [CSII] With External Devices: Current Status. Update in Drug Delivery Systems, Chapter 13, pp. 163-183. Futura Publishing Company.
Skyler J S et al. (1995). The Insulin Pump Therapy Book Insights from the Experts. MiniMed•Technologies.
Strowig S M (1993). Initiation and Management of Insulin Pump Therapy. The Diabetes Educator, vol. 19, No. 1, pp. 50-60.
Walsh J, et al. (1989). Pumping Insulin: The Art of Using an Insulin Pump. Published by MiniMed• Technologies.
(Intensive Diabetes Management, 1995). Insulin Infusion Pump Therapy. pp. 66-78.
Disetronic My Choice™ D-TRON™ Insulin Pump Reference Manual. (no date).
Disetronic H-TRON® plus Quick Start Manual. (no date).
Disetronic My Choice H-TRONplus Insulin Pump Reference Manual. (no date).
Disetronic H-TRON®plus Reference Manual. (no date).
(MiniMed, 1996). The MiniMed 506. 7 pages. Retrieved on Sep. 16, 2003 from the World Wide Web: http://web.archive.org/web/19961111054527/www.minimed.com/files/506_pic.htm.
(MiniMed, 1997). MiniMed 507 Specifications. 2 pages. Retrieved on Sep. 16, 2003 from the World Wide Web: http://web.archive.org/web/19970124234841/www.minimed.com/files/mmn075.htm.
(MiniMed, 1996). FAQ: The Practical Things . . . pp. 1-4. Retrieved on Sep. 16, 2003 from the World Wide Web: http://web.archive.org/web/19961111054546/www.minimed.com/files/faq_pract.htm.
(MiniMed, 1997). Wanted: a Few Good Belt Clips! 1 page. Retrieved on Sep. 16, 2003 from the World Wide Web: http://web.archive.org/web/19970124234559/www.minimed.com/files/mmn002.htm.
(MiniMed Technologies, 1994). MiniMed 506 Insulin Pump User's Guide.
(MiniMed Technologies, 1994). MiniMed™ Dosage Calculator Initial Meal Bolus Guidelines / MiniMed™ Dosage Calculator Initial Basal Rate Guidelines Percentage Method. 4 pages.
(MiniMed, 1996). MiniMed™ 507 Insulin Pump User's Guide.
(MiniMed, 1997). MiniMed™ 507 Insulin Pump User's Guide.
(MiniMed, 1998). MiniMed™ 507C Insulin Pump User's Guide.
(MiniMed International, 1998). MiniMed 507C Insulin Pump For those who appreciate the difference.
(MiniMed Inc., 1999). MiniMed 508 Flipchart Guide to Insulin Pump Therapy.
(MiniMed Inc., 1999). Insulin Pump Comparison / Pump Therapy Will Change Your Life.
(MiniMed, 2000). MiniMed® 508 User's Guide.
(MiniMed Inc., 2000). MiniMed® Now [I] Can Meal Bolus Calculator / MiniMed® Now [I] Can Correction Bolus Calculator.
(MiniMed Inc., 2000). Now [I] Can MiniMed Pump Therapy.
(MiniMed Inc., 2000). Now [I] Can MiniMed Diabetes Management.
(Medtronic MiniMed, 2002). The 508 Insulin Pump A Tradition of Excellence.
(Medtronic MiniMed, 2002). Medtronic MiniMed Meal Bolus Calculator and Correction Bolus Calculator. International Version.

Abel, P., et al., "Experience with an implantable glucose sensor as a prerequisite of an artificial beta cell," Biomed. Biochim. Acta 43 (1984) 5, pp. 577-584.

Bindra, Dilbir S., et al., "Design and in Vitro Studies of a Needle-Type Glucose Sensor for a Subcutaneous Monitoring," American Chemistry Society, 1991, 63, pp. 1692-1696.

Boguslavsky, Leonid, et al., "Applications of redox polymers in biosensors," Sold State Ionics 60, 1993, pp. 189-197.

Geise, Robert J., et al., "Electropolymerized 1,3-diaminobenzene for the construction of a 1,1'-dimethylferrocene mediated glucose biosensor," Analytica Chimica Acta, 281, 1993, pp. 467-473.

Gernet, S., et al., "A Planar Glucose Enzyme Electrode," Sensors and Actuators, 17, 1989, pp. 537-540.

Gernet, S., et al., "Fabrication and Characterization of a Planar Electromechanical Cell and its Application as a Glucose Sensor," Sensors and Actuators, 18, 1989, pp. 59-70.

Gorton, L., et al., "Amperometric Biosensors Based on an Apparent Direct Electron Transfer Between Electrodes and Immobilized Peroxiases," Analyst, Aug. 1991, vol. 117, pp. 1235-1241.

Gorton, L., et al., "Amperometric Glucose Sensors Based on Immobilized Glucose-Oxidizing Enymes and Chemically Modified Electrodes," Analytica Chimica Acta, 249, 1991, pp. 43-54.

Gough, D. A., et al., "Two-Dimensional Enzyme Electrode Sensor for Glucose," Analytical Chemistry, vol. 57, No. 5, 1985, pp. 2351-2357.

Gregg, Brian A., et al., "Cross-Linked Redox Gels Containing Glucose Oxidase for Amperometric Biosensor Applications," Analytical Chemistry, 62, pp. 258-263.

Gregg, Brian A., et al., "Redox Polymer Films Containing Enzymes. 1. A Redox-Conducting Epoxy Cement: Synthesis, Characterization, and Electrocatalytic Oxidation of Hydroquinone," The Journal of Physical Chemistry, vol. 95, No. 15, 1991, pp. 5970-5975.

Hashiguchi, Yasuhiro, MD, et al., "Development of a Miniaturized Glucose Monitoring System by Combining a Needle-Type Glucose Sensor With Microdialysis Sampling Method," Diabetes Care, vol. 17, No. 5, May 1994, pp. 387-389.

Heller, Adam, "Electrical Wiring of Redox Enzymes," Acc. Chem. Res., vol. 23, No. 5, May 1990, pp. 128-134.

Jobst, Gerhard, et al., "Thin-Film Microbiosensors for Glucose-Lactate Monitoring," Analytical Chemistry, vol. 68, No. 18, Sep. 15, 1996, pp. 3173-3179.

Johnson, K.W., et al., "In vivo evaluation of an electroenzymatic glucose sensor implanted in subcutaneous tissue," Biosensors & Bioelectronics, 7, 1992, pp. 709-714.

Jönsson, G., et al., "An Electromechanical Sensor for Hydrogen Peroxide Based on Peroxidase Adsorbed on a Spectrographic Graphite Electrode," Electroanalysis, 1989, pp. 465-468.

Kanapieniene, J. J., et al., "Miniature Glucose Biosensor with Extended Linearity," Sensors and Actuators, B. 10, 1992, pp. 37-40.

Kawamori, Ryuzo, et al., "Perfect Normalization of Excessive Glucagon Responses to Intraveneous Arginine in Human Diabetes Mellitus With the Artificial Beta-Cell," Diabetes vol. 29, Sep. 1980, pp. 762-765.

Kimura, J., et al., "An Immobilized Enzyme Membrane Fabrication Method," Biosensors 4, 1988, pp. 41-52.

Koudelka, M., et al., "In-vivo Behaviour of Hypodermically Implanted Microfabricated Glucose Sensors," Biosensors & Bioelectronics 6, 1991, pp. 31-36.

Koudelka, M., et al., "Planar Amperometric Enzyme-Based Glucose Microelectrode," Sensors & Actuators, 18, 1989, pp. 157-165.

Mastrototaro, John J., et al., "An electroenzymatic glucose sensor fabricated on a flexible substrate," Sensors & Actuators, B. 5, 1991, pp. 139-144.

Mastrototaro, John J., et al., "An Electroenzymatic Sensor Capable of 72 Hour Continuous Monitoring of Subcutaneous Glucose," 14th Annual International Diabetes Federation Congress, Washington D.C., Jun. 23-28, 1991.

McKean, Brian D., et al., "A Telemetry-Instrumentation System for Chronically Implanted Glucose and Oxygen Sensors," IEEE Transactions on Biomedical Engineering, Vo. 35, No. 7, Jul. 1988, pp. 526-532.

Monroe, D., "Novel Implantable Glucose Sensors," ACL, Dec. 1989, pp. 8-16.

Morff, Robert J., et al., "Microfabrication of Reproducible, Economical, Electroenzymatic Glucose Sensors," Annuaal International Conference of teh IEEE Engineering in Medicine and Biology Society, Vo. 12, No. 2, 1990, pp. 483-484.

Moussy, Francis, et al., "Performance of Subcutaneously Implanted Needle-Type Glucose Sensors Employing a Novel Trilayer Coating," Analytical Chemistry, vol. 65, No. 15, Aug. 1, 1993, pp. 2072-2077.

Nakamoto, S., et al., "A Lift-Off Method for Patterning Enzyme-Immobilized Membranes in Multi-Biosensors," Sensors and Actuators 13, 1988, pp. 165-172.

Nishida, Kenro, et al., "Clinical applications of teh wearable artifical endocrine pancreas with the newly designed needle-type glucose sensor," Elsevier Sciences B.V., 1994, pp. 353-358.

Nishida, Kenro, et al., "Development of a ferrocene-mediated needle-type glucose sensor covereed with newly designd biocompatible membrane, 2-methacryloyloxyethylphosphorylcholine -co-n-butyl nethacrylate," Medical Progress Through Technology, vol. 21, 1995, pp. 91-103.

Poitout, V., et al., "A glucose monitoring system for on line estimation oin man of blood glucose concentration using a miniaturized glucose sensor implanted in the subcutaneous tissue adn a wearable control unit," Diabetologia, vol. 36, 1991, pp. 658-663.

Reach, G., "A Method for Evaluating in vivo the Functional Characteristics of Glucose Sensors," Biosensors 2, 1986, pp. 211-220.

Shaw, G. W., et al., "In vitro testing of a simply constructed, highly stable glucose sensor suitable for implantation in diabetic patients," Biosensors & Bioelectronics 6, 1991, pp. 401-406.

Shichiri, M., "A Needle-Type Glucose Sensor—A Valuable Tool Not Only for a Self-Blood Glucose Monitoring but for a Wearable Artifiical Pancreas," Life Support Systems Proceedings, XI Annual Meeting ESAO, Alpbach-Innsbruck, Austria, Sep. 1984, pp. 7-9.

Shichiri, Motoaki, et al., "An artificial endocrine pancreas—problems awaiting solution for long-term clinical applications of a glucose sensor," Frontiers Med. Biol. Engng., 1991, vol. 3, No. 4, pp. 283-292.

Shichiri, Motoaki, et al., "Closed-Loop Glycemic Control with a Wearable Artificial Endocrine Pancreas—Variations in Daily Insulin Requirements to Glycemic Response," Diabetes, vol. 33, Dec. 1984, pp. 1200-1202.

Shichiri, Motoaki, et al., "Glycaemic Control in a Pacreatectomized Dogs with a Wearable Artificial Endocrine Pancreas," Diabetologia, vol. 24, 1983, pp. 179-184.

Shichiri, M., et al., "In Vivo Characteristics of Needle-Type Glucose Sensor—Measurements of Subcutaneous Glucose Concentrations in Human Volunteers," Hormone and Metabolic Research, Supplement Series vol. No. 20, 1988, pp. 17-20.

Shichiri, M., et al., "Membrane design for extending the long-life of an implantable glucose sensor," Diab. Nutr. Metab., vol. 2, No. 4, 1989, pp. 309-313.

Shichiri, Motoaki, et al., "Normalization of the Paradoxic Secretion of Glucagon in Diabetes Who Were Controlled by the Artificial Beta Cell," Diabetes, vol. 28, Apr. 1979, pp. 272-275.

Shichiri, Motoaki, et al., "Telemetry Glucose Monitoring Device with Needle-Type Glucose Sensor: A useful Tool for Blood Glucose Monitoring in Diabetic Individuals," Diabetes Care, vol. 9, No. 3, May-Jun. 1986, pp. 298-301.

Shichiri, Motoaki, et al., "Wearable Artificial Endocrine Pancreas with Needle-Type Glucose Sensor," The Lancet, Nov. 20, 1982, pp. 1129-1131.

Shichiri, Motoaki, et al., "The Wearable Artificial Endocrine Pancreas with a Needle-Type Glucose Sensor: Perfect Glycemic Control in Ambulatory Diabetes," Acta Paediatr Jpn 1984, vol. 26, pp. 359-370.

Shinkai, Seiji, "Molecular Recognitiion of Mono- and Di-saccharides by Phenylboronic Acids in Solvent Extraction and as a Monolayer," J. Chem. Soc., Chem. Commun., 1991, pp. 1039-1041.

Shults, Mark C., "A Telemetry-Instrumentation System for Monitoring Multiple Subcutaneously Implanted Glucose Sensors," IEEE Transactions on Biomedical Engineering, vol. 41, No. 10, Oct. 1994, pp. 937-942.

Sternberg, Robert, et al., "Study and Development of Multilayer Needle-type Enzyme-based Glucose Microsensors," Biosensors, vol. 4, 1988, pp. 27-40.

Tamiya, E., et al., "Micro Glucose Sensors using Electron Mediators Immobilized on a Polypyrrole-Modified Electrode," Sensors and Actuators, vol. 18, 1989, pp. 297-307.

Tsukagoshi, Kazuhiko, et al., "Specific Complexation with Mono- and Disaccharides that can be Detected by Circular Dichroism," J. Org. Chem., vol. 56, 1991, pp. 4089-4091.

Urban, G., et al., "Miniaturized multi-enzyme biosensors integrated with pH sensors on flexible polymer carriers for in vivo applciations," Biosensors & Bioelectronics, vol. 7, 1992, pp. 733-739.

Ubran, G., et al., "Miniaturized thin-film biosensors using covalently immobilized glucose oxidase," Biosensors & Bioelectronics, vol. 6, 1991, pp. 555-562.

Velho, G., et al., "In vivo calibration of a subcutaneous glucose sensor for determination of subcutaneous glucose kinetics," Diab. Nutr. Metab., vol. 3, 1988, pp. 227-233.

Wang, Joseph, et al., "Needle-Type Dual Microsensor for the Simultaneous Monitoring of Glucose and Insulin," Analytical Chemistry, vol. 73, 2001, pp. 844-847.

Yamasaki, Yoshimitsu, et al., "Direct Measurement of Whole Blood Glucose by a Needle-Type Sensor," Clinics Chimica Acta, vol. 93, 1989, pp. 93-98.

Yokoyama, K., "Integrated Biosensor for Glucose and Galactose," Analytica Chimica Acta, Vol. 218, 1989, pp. 137-142.

* cited by examiner

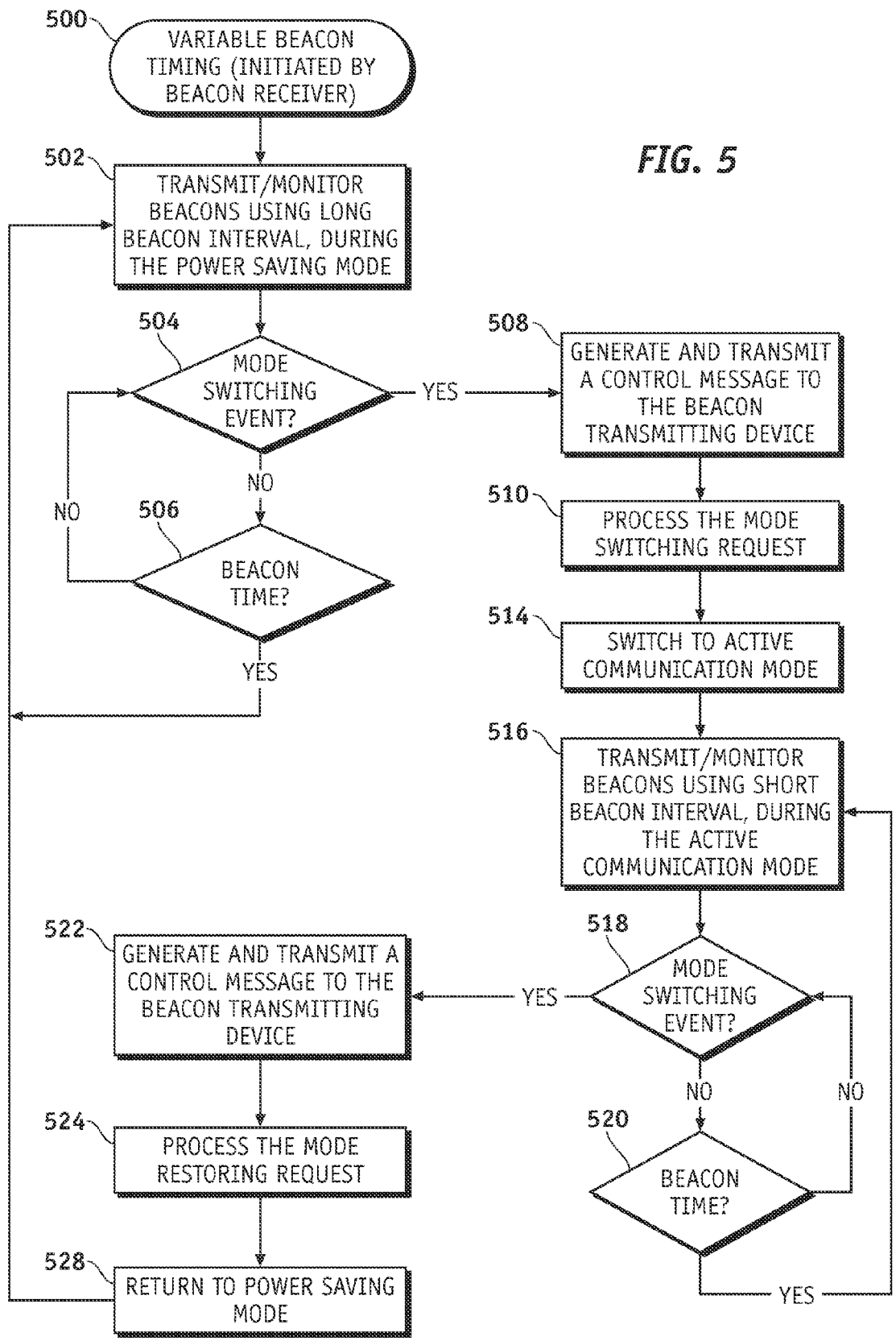

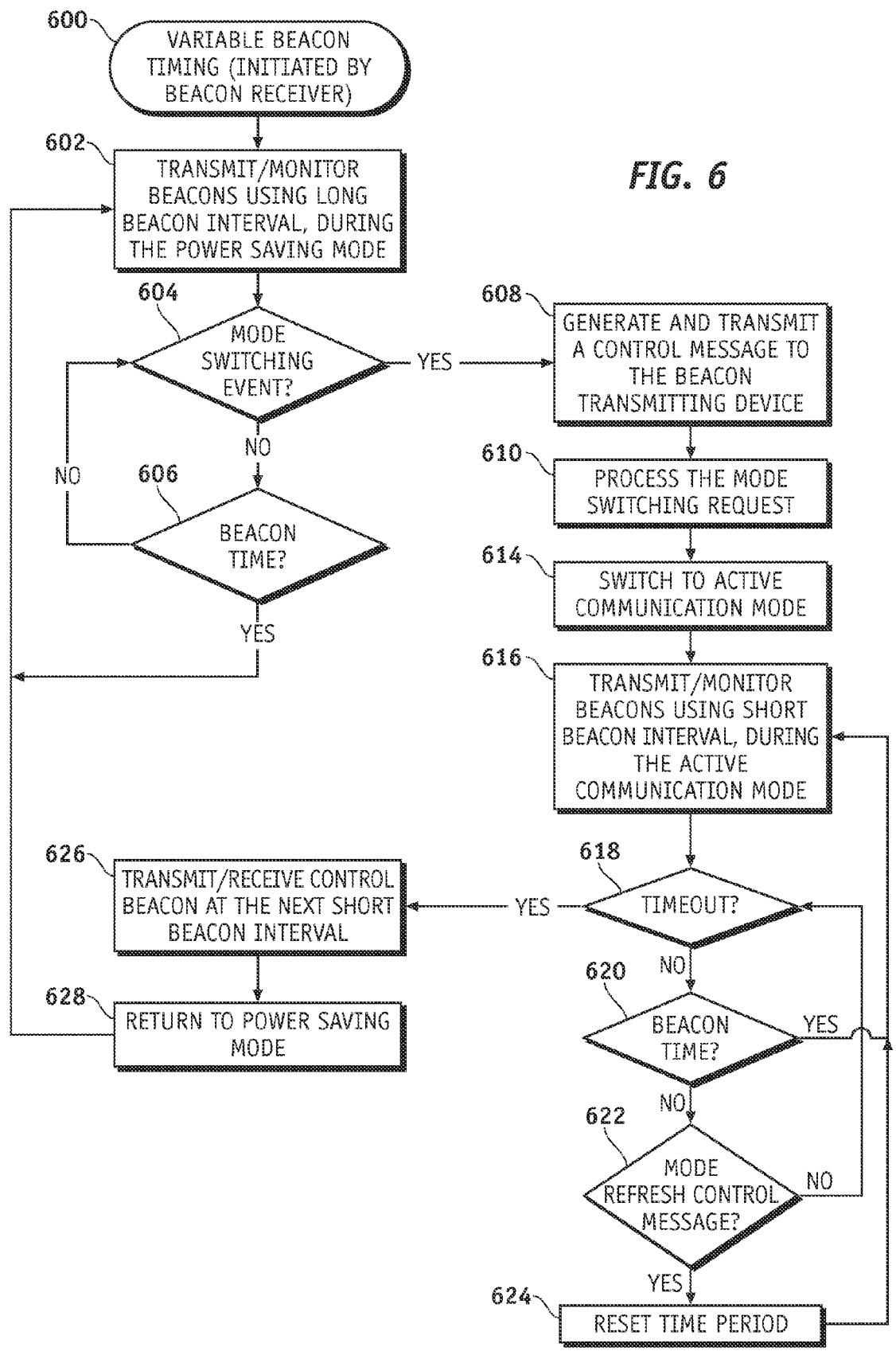

SYSTEM AND METHOD FOR VARIABLE BEACON TIMING WITH WIRELESS DEVICES

TECHNICAL FIELD

Embodiments of the subject matter described herein relate generally to wireless communication and wireless systems. More particularly, the embodiments relate to systems and techniques related to the transmission of beacons in a wireless system, such as a medical device network environment that includes wireless devices.

BACKGROUND

Wireless devices and related wireless communication techniques and protocols have become ubiquitous in modern society. Indeed, the prior art is replete with wireless devices such as cellular telephones, mobile computers, personal digital assistants, digital media players, portable video game devices, and the like. Moreover, portable medical devices having wireless data communication capabilities are becoming increasingly popular, especially for patients that have conditions that must be monitored on a continuous or frequent basis. For example, diabetics are usually required to modify and monitor their daily lifestyle to keep their body in balance, in particular, their blood glucose ("BG") levels. Individuals with Type 1 diabetes and some individuals with Type 2 diabetes use insulin to control their BG levels. To do so, diabetics routinely keep strict schedules, including ingesting timely nutritious meals, partaking in exercise, monitoring BG levels daily, and adjusting and administering insulin dosages accordingly. Diabetics may utilize wireless medical devices that are deployed in a network environment in a manner that facilitates data communication between two or more separate devices.

The prior art includes a number of insulin pump systems that are designed to deliver accurate and measured doses of insulin via infusion sets (an infusion set delivers the insulin through a small diameter tube that terminates at a cannula inserted under the patient's skin). In lieu of a syringe, the patient can simply activate the insulin pump to administer an insulin bolus as needed, for example, in response to the patient's current BG level. A patient can measure his BG level using a BG measurement device, such as a test strip meter, a continuous glucose measurement system, or the like. BG measurement devices use various methods to measure the BG level of a patient, such as a sample of the patient's blood, a sensor in contact with a bodily fluid, an optical sensor, an enzymatic sensor, or a fluorescent sensor. When the BG measurement device has generated a BG measurement, the measurement is displayed on the BG measurement device. A continuous glucose monitoring system can monitor the patient's BG level in real time.

Insulin pumps and continuous glucose monitoring devices may also be configured to communicate with remote control devices, monitoring or display devices, BG meters, and other devices associated with such an infusion system. For example, a continuous glucose monitoring sensor may include a wireless radio frequency ("RF") transmitter that communicates with a BG monitor device within the infusion system. As another example, the infusion system may include a handheld remote control that communicates with the infusion pump device using wireless techniques.

Conventional wireless systems, including many wireless medical device systems, rely on synchronized beacons, which are utilized to manage wireless communication between wireless network devices. Beacons are usually transmitted at predetermined and fixed intervals, and the beacon interval is known by the transmitting and receiving devices. Knowledge of the beacon interval allows the receiving device to "wake up" from its power saving mode at the appropriate time to receive the beacons according to the designated interval schedule. In many systems, such as a conventional wireless medical device system, the beacon interval is a fixed interval that is based upon the fastest response time needed by a device within the system. Unfortunately, this type of configuration results in excessive power consumption because the beacon transmitting devices must support the fixed beacon interval even during periods when no data needs to be communicated. In turn, excessive power consumption leads to reduced battery life and/or more frequent battery recharging cycles, or requires increasing the size of the battery (and, therefore, the device itself) to accommodate beacon transmissions.

BRIEF SUMMARY

The systems, techniques, and protocols described here can be utilized with a variety of wireless devices, such as wireless personal medical devices. The subject matter described here relates to the control of variable beacon timing in a manner that conserves power (e.g., battery power in a portable wireless device). In preferred embodiments, a relatively long beacon interval is used during a power saving mode, and a relatively short beacon interval is used during an active communication mode.

The above and other aspects may be carried out by an embodiment of a variable beacon timing method for a first wireless device and a second wireless device. The method begins by periodically transmitting beacons from the first wireless device to the second wireless device at a first rate during a first operating mode. Then, the first wireless device initiates a switch from the first operating mode to a second operating mode, and transmits a control beacon to the second wireless device. The control beacon is transmitted in accordance with the first rate, and the control beacon conveys a mode switching command for the second wireless device. Thereafter, the first wireless device periodically transmits beacons at a second rate during the second operating mode.

Another embodiment of a variable beacon timing method for a first wireless device and a second wireless device is also provided. This method begins by transmitting beacons from the first wireless device to the second wireless device during a first operating mode and in accordance with a first time schedule. The first wireless device receives a control message from the second wireless device, the control message conveying a mode switching request. Thereafter, the first wireless device periodically transmits beacons during the second operating mode and in accordance with a second time schedule and the second wireless device also switches to the second operating mode and in accordance with the second time schedule.

Yet another variable beacon timing method for a first wireless device and a second wireless device is provided. This method involves: periodically monitoring for beacons transmitted by the first wireless device at a first rate during a first operating mode, the beacons including a control beacon that conveys a mode switching command for the second wireless device, and receiving the control beacon and the mode switching command. In response to the mode switching command, the second wireless device switches from the first operating mode to the second operating mode. Thereafter, the method periodically monitors for beacons transmitted by the first wireless device at a second rate during the second operating mode.

Another embodiment of a variable beacon timing method for a first wireless device and a second wireless device involves: monitoring for beacons transmitted by the first wireless device during a first operating mode and in accordance with a first time schedule; and transmitting a control message to the first wireless device, the control message conveying a mode switching request. Then, the second wireless device switches from the first operating mode to the second operating mode. Thereafter, the method monitors for beacons transmitted by the first wireless device during the second operating mode and in accordance with a second time schedule.

The above and other aspects may be found in an embodiment of a system of wireless devices that are configured to wirelessly communicate with one another. The system includes a beacon-transmitting wireless device and a listening wireless device. The beacon-transmitting wireless device is configured to transmit, during a first operating mode, wireless beacons separated in time by relatively long time intervals. The beacon-transmitting wireless device is also configured to transmit, during a second operating mode, wireless beacons separated in time by relatively short time intervals. The listening wireless device is configured to listen, during the first operating mode, for wireless beacons transmitted by the beacon-transmitting wireless device. The listening wireless device is further configured to listen, during the second operating mode, for wireless beacons transmitted by the beacon-transmitting wireless device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 is a flow chart that illustrates a second embodiment of a variable beacon timing process; and FIG. 6 is a flow chart that illustrates a third embodiment of a variable beacon timing process.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to wireless devices, wireless data communication, medical devices, infusion system operation, insulin pump operation, blood glucose sensing and monitoring, and other functional aspects of the systems (and the individual operating components of the systems) may not be described in detail here. Exemplary embodiments are described herein in the context of an infusion system having wireless medical devices. Examples of infusion pumps and/or communication options may be of the type described in, but not limited to, U.S. Pat. Nos. 4,562,751; 4,685,903; 5,080,653; 5,505,709; 5,097,122; 6,554,798; 6,558,320; 6,558,351; 6,641,533; 6,659,980; 6,752,787; 6,817,990; and 6,932,584, which are herein incorporated by reference. Examples of glucose sensing and/or monitoring devices maybe be of the type described in, but not limited to, U.S. Pat. Nos. 6,484,045; 6,809,653; 6,892,085; and 6,895,263, which are herein incorporated by reference.

Figure 1:
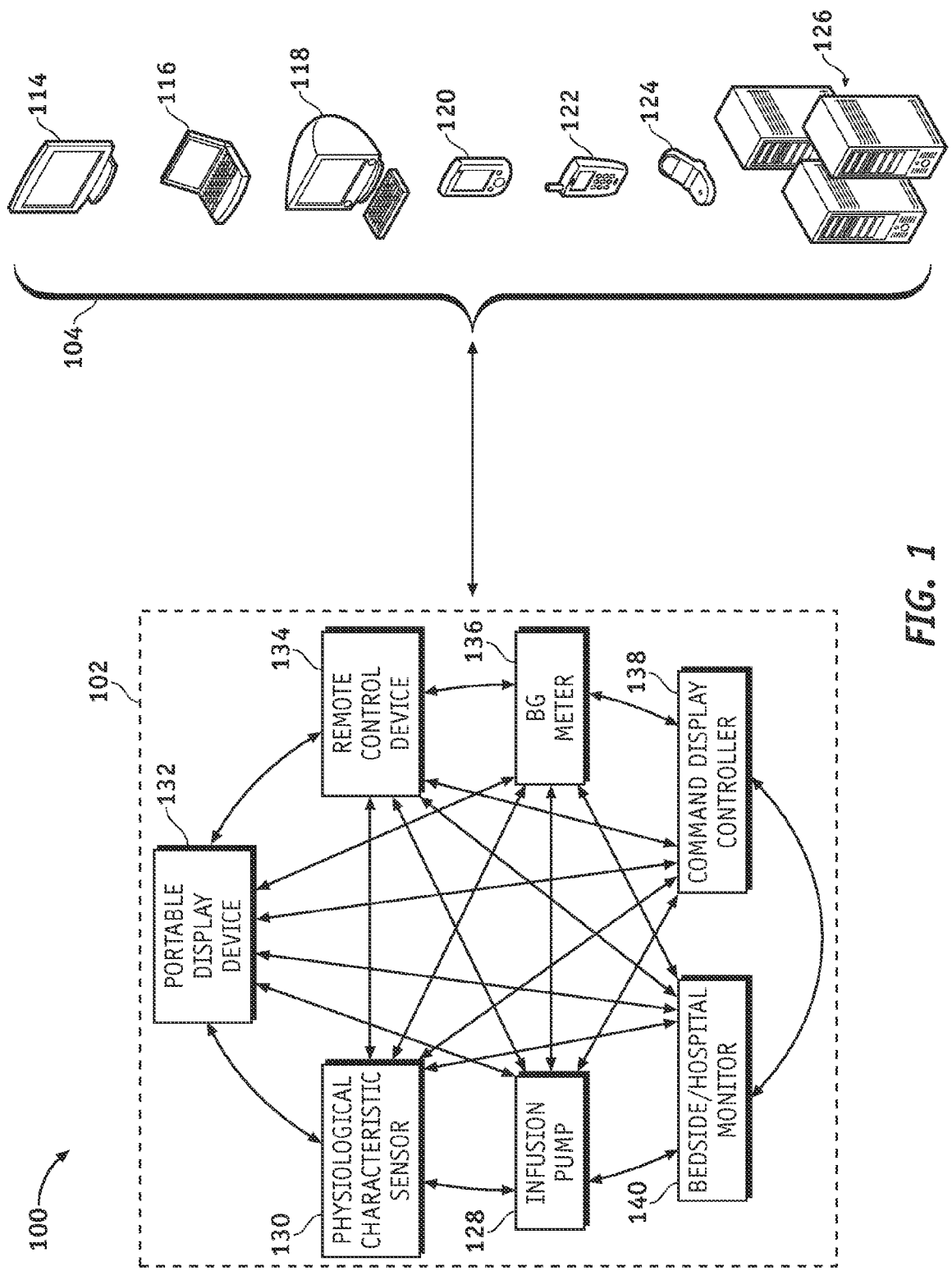
FIG. 1 is a schematic representation of a medical device system that includes wireless devices.

Although the disclosed subject matter relates generally to wireless devices regardless of their particular implementation or purpose, a medical device application is described here. FIG. 1 is a schematic representation of a medical device system 100 configured in accordance with an exemplary embodiment. In this example, system 100 is an insulin infusion system that controls the infusion of insulin into the body of a user, although aspects of system 100 may also be utilized in the context of other medical device systems. Briefly, system 100 includes a local infusion system 102 having one or more local devices configured to wirelessly communicate with each other. The local devices may be capable of communication (unidirectional or bidirectional) with one or more devices 104 that are "external" to local infusion system 102. The manner in which a given local device within local infusion system 102 communicates with a given device 104 may vary depending upon the particular configuration of system 100, the characteristics of the local device, and the characteristics of the device 104. For example, data may be routed between local infusion system 102 and a device 104 using one data communication network, using a plurality of data communication networks, using a direct wireless or wired connection, or the like.

The flexible nature of medical device system 100 is illustrated in FIG. 1, which depicts local infusion system 102 in communication with a variety of external and remote devices 104. In an embodiment, local devices within local infusion system 102 may be suitably configured to support the transmission of data to: a stationary monitor device 114, such as a bedside monitor or a piece of hospital monitoring equipment; a portable computer 116, such as a laptop PC, a palmtop PC, or a tablet PC; a stationary computer 118, such as a desktop PC; a personal digital assistant 120, which may also be a portable email device; a smart phone 122, which may also be a portable email device; a wireless phone 124, such as a cellular phone or a cordless phone; one or more additional computing devices or databases 126; or the like. The above list of possible devices 104 is not exhaustive, and an implementation of system 100 can be designed to accommodate communication with other systems, equipment, computing devices, components, and elements that are external to local infusion system 102.

In one embodiment, local infusion system 102 is realized as an insulin infusion system that is locally controlled and monitored by the patient. In this example, local infusion system 102 includes at least an infusion pump 128. Local infusion system 102 may also include any of the following components, without limitation: a physiological characteristic sensor 130, such as a continuous glucose sensor (which may include a wireless transmitter); a portable display device 132; a remote control device 134; a BG meter 136 or other physiological characteristic meter; a command display controller 138 for infusion pump 128; and a monitor 140, which may be realized as a bedside monitor or a hospital monitor.

As depicted in FIG. 1, these local devices may be configured to transmit and receive local communications within local infusion system 102, where such local communications are transmitted and received in accordance with one or more specified local data communication protocols. For example, local communications may be exchanged between local devices using one or more wireless data communication protocols (which may leverage RF, infrared, magnetic induction, or other wireless techniques) and/or using one or more wired data communication protocols. Local infusion system 102 may be flexibly configured such that any given local device can communicate with any other local device, and a communication link or path between two local devices may be unidirectional or bidirectional. FIG. 1 depicts an exemplary embodiment where each communication link or path is bidirectional (represented by double headed arrows).

Infusion pump 128 is configured to deliver fluid, such as insulin, into the body of a user via, for example, an infusion set. In accordance with one exemplary embodiment, infusion pump 128 serves as a central hub, and most of the processing logic and intelligence for local infusion system 102 resides at infusion pump 128. In some embodiments, the local medical device system need not include infusion pump 128, for example, monitoring systems utilized in conjunction with traditional insulin injection therapy. Moreover, infusion pump 128 need not include a display. In an embodiment that lacks a display, portable display device 132, remote control device 134, command display controller 138, or any other device within local infusion system 102 may serve as a remote display for infusion pump 128. Other options for a remote display include, but are not limited to, any of the devices 104 described above, e.g., wireless phone 124, monitor device 114, portable computer 116, or personal digital assistant 120.

In practice, operation of infusion pump 128 may be remotely controlled by command display controller 138 (which may be realized as a handheld monitor/controller for infusion pump 128), by remote control device 134, and/or by or monitor 140. In one exemplary embodiment, BG meter 136 may include the functionality of a controller device such that both components share a single housing. Control of infusion pump 128 may also be possible via a suitably configured user interface located at infusion pump 128 itself.

Local infusion system 102 may also include physiologic characteristic sensor 130, which is suitably configured to measure a physiologic characteristic of the patient. In addition, sensor 130 may include processing and control logic that enables it to control the operation of infusion pump 128. Such control may be responsive to measurements obtained by sensor 130. In the exemplary system described here, sensor 130 is a continuous BG sensor that measures the BG level of the patient in real time. Sensor 130 may include a wireless transmitter that facilitates transmission of physiologic data of the user to other devices within local infusion system 102. Alternatively, sensor 130 may be directly wired to a monitor/user interface. Sensor 130 may also be linked to monitor 140 so that monitoring and programming of medication delivery may be performed remotely. Alternatively, sensor 130 may communicate directly with devices in the external network space, e.g., via Bluetooth, ZigBee or the like.

Local devices can process the received sensor data in an appropriate manner. For example, portable display device 132, remote control device 134, BG meter 136, command display controller 138, monitor 140, or infusion pump 128 may display the current BG level derived from the received sensor data and/or generate an alert or otherwise indicate low or high BG levels. As another example, BG meter 136 or infusion pump 128 may process the received sensor data for purposes of calibration. As yet another example, infusion pump 128 may be configured to activate its infusion mechanism in response to the received sensor data. Moreover, sensor data could be processed in one or more of the local devices and/or in one or more of devices 104. In this regard, system 100 may utilize distributed processing techniques for the handling of sensor data.

Any of the devices within local infusion system 102 may include a display and related processing logic that facilitates the display of physiologic patient data, device status information, time and date information, alarm/alert status, and other information related to the operation, status, or condition of the patient, related to any of the devices within local infusion system 102, or related to local infusion system 102 itself. Portable display device 132 may be realized as a small device having limited functionality. In this regard, portable display device 132 may be incorporated into a key fob, a carabiner, a pendant, an insulin pen, a credit card display, or the like. Other local devices may have expanded display capabilities related to the specific functionality of such devices. For example, BG meter 136 may include display features that are specific to its metering functionality.

BG meter 136 is generally configured to measure the BG level of a user by analyzing a blood sample. For example, BG meter 136 may include a receptacle for receiving a blood sample test strip. In this regard, the user inserts a test strip into the BG meter 136, which analyzes the sample and displays a BG level corresponding to the test strip sample. BG meter 136 may be configured to generate a local communication, which conveys the measured BG level, for transmission to other local devices within local infusion system 102. Depending upon the specific application, BG meter 136 may also include the functionality of a monitoring device for infusion pump 128 and/or the functionality of a controller device for infusion pump 128.

Command display controller 138 is preferably realized as a handheld monitor/controller device that, although physically separate from infusion pump 128, enables the user to monitor and control the operation of infusion pump 128. This allows the user to operate infusion pump 128 without physically handling the device. As described in more detail below, command display controller 138 includes a communication module for transmitting local communications or commands to infusion pump 128. In further embodiments, command display controller 138 may receive local communications sent from infusion pump 128 or other components within local infusion system 102. In exemplary embodiments, command display controller 138 also includes a network communication module for handling network communications to and from network devices that are external to local infusion system 102. Further, command display controller 138 may include one or more user input elements on its housing, such as keys, buttons, or the like, which accommodate user inputs. In certain embodiments, command display controller 138 includes a display on its housing, which may be configured to concurrently reproduce at least a portion of the information displayed on infusion pump 128.

Monitor 140, which may be realized as a bedside monitor for personal use or as a hospital monitor for caregiver use, enables remote monitoring of infusion pump 128 (and possibly other devices within local infusion system 102). Monitor 140 and other monitors described herein may be utilized in applications that do not utilize infusion pump 128; for example, applications that monitor patient data (such as glucose levels). In addition, monitor 140 may be suitably configured to enable remote programming and control of infusion pump 128 and/or other devices within local infusion system 102. In this regard, a "monitor" as used herein can generally refer to a monitor-only device or a monitor-controller device. In practice, monitor 140 is a relatively large device in comparison to portable or handheld devices of local infusion system 102. In contrast to remote control device 134, portable display device 132, and command display controller 138, monitor 140 is intended to be somewhat stationary and not carried by the user. For example, a bedside monitor may be located on a nightstand beside the patient's bed, while a hospital monitor may be located on a medical equipment cart or stand in the patient's room. In contrast to the smaller portable devices of local infusion system 102, monitor 140 preferably includes a large and easy to read display element, which may be configured to concurrently reproduce at least a portion of the information displayed on infusion pump 128.

As described above in connection with command display controller 138, monitor 140 may also be configured to allow the user to remotely operate infusion pump 128. Monitor 140 may include a communication module for receiving and/or transmitting local communications within local infusion system 102. Moreover, monitor 140 may include a network communication module for handling network communications to and from network devices that are external to local infusion system 102. Further, monitor 140 may include one or more user input elements on its housing, such as keys, buttons, or the like, which accommodate user inputs.

As shown in FIG. 1, local infusion system 102 is capable of establishing many potential communication paths between the local devices. In certain embodiments, a controller device (e.g., remote control device 134, command display controller 138, or monitor 140) may serve as a translator between infusion pump 128 and the other components of local infusion system 102, such as BG meter 136. For example, the controller device may have the ability to determine how best to translate data received from infusion pump 128 for compatibility with the display requirements of a destination device within local infusion system 102. As depicted in FIG. 1, infusion pump 128 may communicate directly with BG meter 136. In some embodiments, local infusion system 102 may include multiple controllers that can communicate with infusion pump 128. In other embodiments, only one controller device can communicate with infusion pump 128 at any given moment. The controller device functionality may also be integrated into infusion pump 128 in some embodiments. In yet another embodiment, BG meter 136 may be integrated into the controller device such that both features share a single device housing.

At least two devices in local infusion system 102 are preferably capable of supporting wireless data communication with each other. The embodiments described herein employ wireless beacons (transmitted by at least one beacon-transmitting device) for purposes of wireless communication management. A beacon is a transmission from a device in a wireless network to which other devices are synchronized. For example, beacons are transmitted periodically from the coordinator (the hub) of a star network. Different devices within the network know the beacon transmission period and "listen" for beacons in accordance with the designated period (or multiples thereof) to synchronize their timing, listen for messages, and/or respond with messages. In practice, the beacon-transmitting wireless device will be adjusted to support the highest beacon transmission rate needed by any listening wireless device within the system, whether or not all of the listening wireless devices are utilizing that particular beacon transmission rate. In other words, listening wireless devices A, B, and C could be listening for beacons being transmitted at three different rates. If listening wireless device A desires to switch from a relatively low rate to a relatively high rate, then it (along with the beacon-transmitting wireless device if necessary) will adjust its listening rate to the relatively high rate, and listening wireless devices B and C need not adjust their listening rates.

Figure 2:
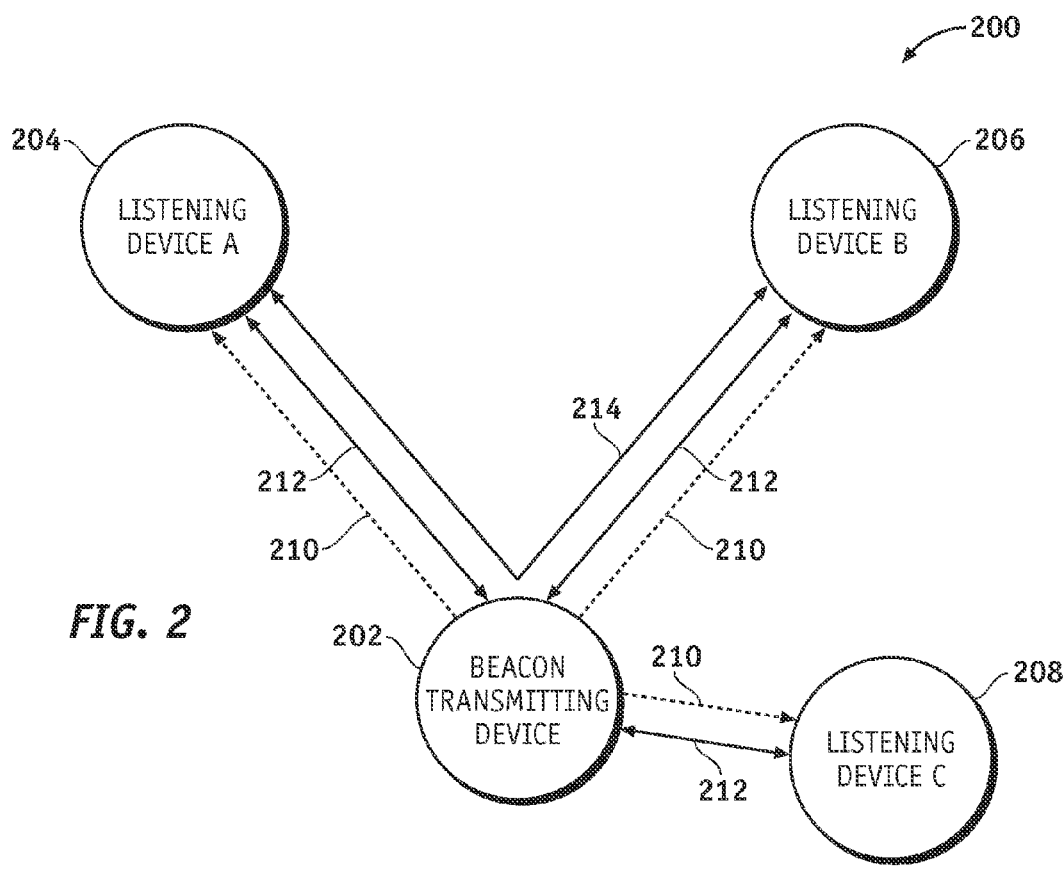
FIG. 2 is a diagram that depicts four wireless devices arranged in a star network configuration.

A plurality of wireless devices in local infusion system 102 can be arranged and configured to operate in any suitable network topology. For example, the wireless devices may be arranged in a star network topology, a mesh network configuration, a tree network topology, an ad-hoc network topology, or the like. In this regard, FIG. 2 is a diagram that depicts four wireless devices arranged in a star network configuration 200 having a beacon-transmitting wireless device 202 and three listening wireless devices 204, 206, 208. This exemplary star network configuration 200 is shown here for ease of description, and is not intended to limit or otherwise restrict the scope of the disclosed subject matter.

In star network configuration 200, beacon-transmitting wireless device 202 may be referred to as the "hub" or "coordinator" device, where the beacon-transmitting wireless device 202 generates and transmits wireless beacons 210, which can be received by listening wireless devices 204, 206, 208. For this implementation, listening wireless devices 204, 206, 208 do not generate or transmit wireless beacons. Moreover, beacon-transmitting wireless device 202 can directly communicate with any of the listening wireless devices 204, 206, 208 (as represented by the solid arrows 212 in FIG. 2). When functioning as the hub or coordinator device, beacon-transmitting wireless device 202 facilitates communication between the listening wireless devices 204, 206, 208 by acting as a wireless repeater, router, or redirector with or without modifications to facilitate such communication. For example, the solid arrow 214 in FIG. 2 schematically illustrates the manner in which beacon-transmitting wireless device 202 can wirelessly route data between listening wireless device 204 and listening wireless device 206. Notably, listening wireless devices 204, 206, 208 are unable to directly communicate with each other in star network configuration 200. Rather, beacon-transmitting wireless device 202 must be utilized as the wireless router between listening wireless devices 204, 206, 208.

Figure 3:
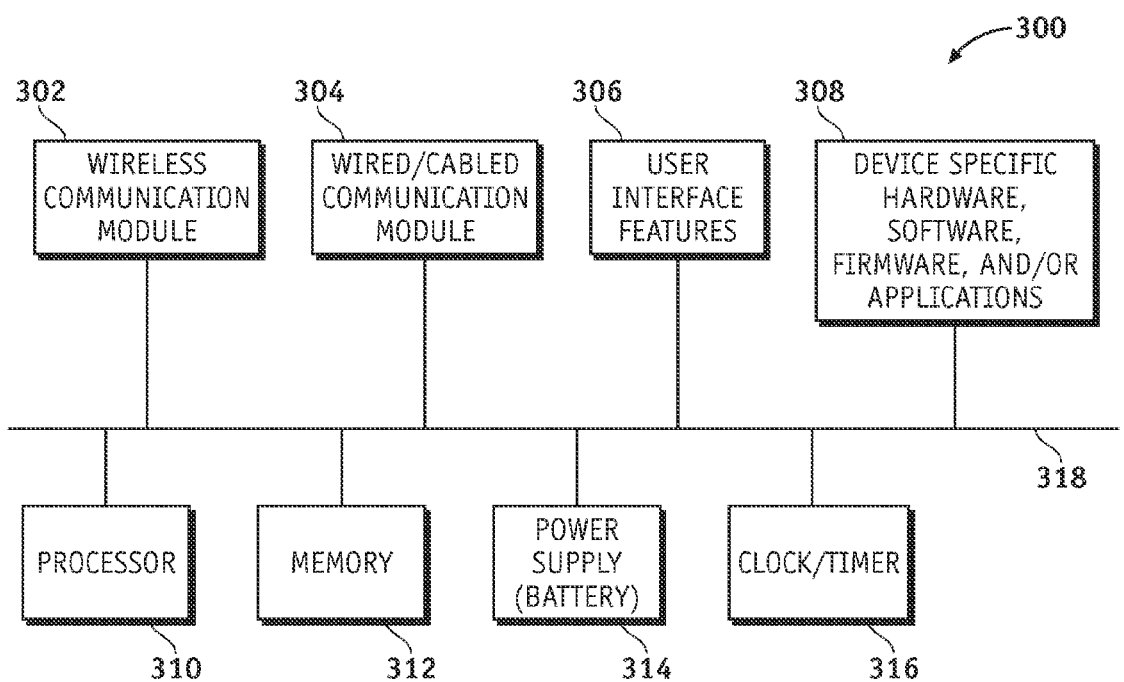
FIG. 3 is a schematic representation of an exemplary embodiment of a wireless device.

FIG. 3 is a schematic representation of an exemplary embodiment of a wireless device 300 suitable for use with the variable beacon timing techniques and protocols described here. Wireless device 300 may be suitably configured to support the particular application and system architecture. For example, wireless device 300 may represent, without limitation: a wireless medical device, such as one of the devices in local infusion system 102 (FIG. 1); a wireless computing device; a mobile communication device; or the like. For the illustrated embodiment, wireless device 300 includes: a wireless communication module 302; a wired/cabled communication module 304; one or more user interface (UI) features 306; device specific hardware, software, firmware, and/or applications 308; a processor 310; a suitable amount of memory 312; a power supply 314, such as a rechargeable or replaceable battery; and a clock/timer 316. An implementation of wireless device 300 may include additional functional elements and components that are suitably configured to support traditional or well known features, which will not be described in detail here. The elements of wireless device 300 may be coupled together via a bus 318 or any suitable interconnection architecture.

Processor 310 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. Processor 310 may be realized as a microprocessor, a controller, a microcontroller, or a state machine. Moreover, processor 310 may be implemented as a combination of computing devices, e.g., a combination of a digital signal processor and a microprocessor, a plurality of microprocessors, one or more microprocessors in conjunction with a digital signal processor core, or any other such configuration.

Memory 312 may be realized as RAM memory, flash memory, EPROM memory, EEPROM memory, registers, a hard disk, a removable disk, a CD-ROM, or any other form of storage medium known in the art. In this regard, memory 312 can be coupled to processor 310 to enable processor 310 to read information from, and write information to, memory 312. In the alternative, memory 312 may be integral to processor 310. As an example, processor 310 and memory 312 may reside in an ASIC.

Device-specific hardware, software, firmware, and/or applications 308 may vary from one embodiment of wireless device 300 to another. For example, a wireless infusion pump device can be implemented in different formats to address the needs of the particular application. On the other hand, a wireless controller device will have a different feature set and different operating capabilities. Accordingly, device-specific hardware, software, firmware, and/or applications 308 will support the functions, operations, and processing requirements of the particular implementation of wireless device 300. In practice, certain portions or aspects of device-specific hardware, software, firmware, and/or applications 308 may be implemented in one or more of the other blocks depicted in FIG. 3.

Wireless device 300 employs at least one wireless communication module 302. In certain embodiments, wireless device 300 also employs at least one wired/cabled communication module 304. These communication modules are suitably configured to support wireless/wired data communication (unidirectional or bidirectional, depending upon the particular implementation) between wireless device 300 and other devices in the system.

Wireless communication module 302 is configured to support one or more wireless data communication protocols. Any number of suitable wireless data communication protocols, techniques, or methodologies may be supported by wireless device 300, including, without limitation: RF; IrDA (infrared); BLUETOOTH®; ZigBee (and other variants of the IEEE 802.15.4 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. In an embodiment of wireless device 300, a wireless data communication module may include or be realized as hardware, software, and/or firmware, such as an RF front end, a suitably configured radio module (which may be a stand alone module or integrated with other or all functions of the device), a wireless transmitter, a wireless receiver, a wireless transceiver, an infrared sensor, an infrared diode and sensor, an electromagnetic transducer, or the like. Moreover, wireless device 300 may include one or more antenna arrangements that cooperate with the wireless data communication module.

As described in more detail below, wireless communication module 302 may be suitably configured and controlled to transmit wireless beacons (if wireless device 300 is designated as a beacon-transmitting device) or suitably configured and controlled to receive wireless beacons (if wireless device 300 is designated as a listening device) at a plurality of different beacon rates. Wireless communication module 302 consumes power from power supply 314 when it transmits beacons, receives beacons, or listens/monitors for beacons. As described in more detail below, wireless communication module 302 can be controlled in a manner that conserves the energy of power supply 314 by reducing the frequency of "unnecessary" beacon transmissions and by reducing the frequency of "unnecessary" beacon receptions.

The optional wired/cabled communication module 304 supports data transfer over a cable, a wired connection, or other physical link. Wired/cabled data communication module 304 is configured to support one or more wired/cabled data communication protocols. Any number of suitable data communication protocols, techniques, or methodologies may be supported by wireless device 300, including, without limitation: Ethernet; home network communication protocols; USB; IEEE 1394 (Firewire); hospital network communication protocols; and proprietary data communication protocols. In an embodiment of wireless device 300, a wired data communication module may include or be realized as hardware, software, and/or firmware, such as a suitably configured and formatted port, connector, jack, plug, receptacle, socket, adaptor, or the like.

Wireless device 300 may also be designed to accommodate UI features 306 that allow the user to control the operation of wireless device 300 and/or other devices within the system. UI features 306 may include a keypad, keys, buttons, switches, knobs, a touchpad, a joystick, a pointing device, a virtual writing tablet, a display element, a speaker or other audio transducer, indicator lights, or any device, component, or function that enables the user to select options, input information, obtain audio information, obtain visual information, or otherwise interact with wireless device 300 and/or other devices within the system.

Clock/timer 316 may be utilized in some embodiments of wireless device 300 to monitor time periods associated with the variable beacon timing procedures described below. In particular, clock/timer 316 can be initiated when wireless device 300 begins operating in an active communication mode, during which the beacon-transmitting device transmits beacons at a relatively high rate, and during which the beacon-receiving devices wake up to listen for beacons at the relatively high rate. In one embodiment, clock/timer 316 monitors how long wireless device 300 has been operating in the active communication mode and, after a predetermined time period has elapsed, wireless device 300 exits the active communication mode and returns to a power saving mode. During the power saving mode, the beacon-transmitting device transmits beacons at a relatively low rate, and the beacon-receiving devices wake up to listen for beacons at the relatively low rate. Wireless device 300 may also use clock/timer 316 for other features and functions that are unrelated to the variable beacon timing protocol.

In operation, wireless device 300 may be a beacon-transmitting wireless device or a listening wireless device, depending upon the particular application, the system configuration, the network topology of the wireless devices in the system, the current operating status of the wireless devices in the system, and/or other factors. For example, in FIG. 2, star network configuration 200 includes only one beacon-transmitting wireless device 202; the remaining wireless devices are designated as listening wireless devices 204, 206, 208. Nonetheless, each wireless device depicted in FIG. 2 may be generally implemented as depicted in FIG. 3.

The variable beacon timing protocol described here employs at least two operating modes: a power saving mode, and an active communication mode. During the power saving mode, wireless beacons are transmitted/received in accordance with a relatively long beacon interval (for example, once every eight seconds). In contrast, during the active communication mode, wireless beacons are transmitted/received in accordance with a relatively short beacon interval (for example, once every two seconds). The following description refers to a simple implementation where only two different beacon intervals are supported. In practice, however, more than two operating modes and more than two respective beacon intervals may be supported by the wireless devices in the system. For example, in a system having three wireless devices, three different modes with three different beacon intervals may be supported.

Switching from the power saving mode to the active communication mode occurs when certain conditions are satisfied. For example, one or more of the wireless devices may switch to the active communication mode in anticipation of transmission of data. As another example, one or more of the wireless devices may switch to the active communication mode when a user interacts with one of the wireless devices. As yet another example, one or more of the wireless devices may switch to the active communication mode in response to certain commands or control instructions generated by a wireless device. Switching back to the power saving mode may be initiated in a number of different ways, which are described in more detail below. Notably, each listening wireless device can switch between operating modes in an independent manner. In other words, one listening wireless device can switch from its power saving mode to the active communication mode, while the remaining listening wireless devices in the system remain in the power saving mode. The beacon-transmitting wireless device will operate in the active communication mode to support any listening wireless devices that are also in the active communication mode. Moreover, the relatively short beacon period used during the active communication mode will also satisfy the beacon transmission requirements of the power saving mode used by the other listening wireless devices.

For a medical device system deployment, such as an infusion system, switching modes in anticipation of data communication can be desirable to make the operation appear seamless and latency-free to the user. For example, the infusion system components can switch to the active communication mode if the user interacts with the user interface of any device in the infusion system, whether or not such interaction actually requires any data communication. Such an anticipatory switch in the operating mode will allow the components to quickly respond to handle subsequent data communication, which can be associated with the relatively short beacon intervals rather than the relatively long beacon intervals. In this example, the active communication mode may be utilized to accommodate the downloading of data (device usage reports, patient data, or the like), software/firmware updating; control commands; or the communication of any data that requires a relatively quick response or action. For certain types of active communication such as downloading of data, it is feasible for the transmitting and listening devices to be in a continually on or active state for the duration of the communication without resorting to beaconing, as long as the beacon interval requirement for the other devices in the network are satisfied (either with or without a beacon mode). For example, it may be acceptable to enter a continually on state for a download session and re-synchronize with other networked devices upon exiting the continuous state and reverting to the beacon mode state.

Accordingly, a system of wireless devices configured as specified herein will include at least a beacon-transmitting wireless device and a listening wireless device. During the power saving mode, the beacon-transmitting wireless device is suitably configured to transmit wireless beacons separated in time by relatively long time intervals, while the listening wireless device is suitably configured to listen for wireless beacons transmitted by the beacon-transmitting wireless device. In practice, the listening wireless device wakes up in a synchronized manner to listen for the wireless beacons. In other words, the wakeup periods of the listening wireless device are separated in time by the same relatively long beacon transmit intervals used by the beacon-transmitting device. On the other hand, during the active communication mode the beacon-transmitting device is suitably configured to transmit wireless beacons separated in time by relatively short time intervals, while the listening wireless device is suitably configured to listen for wireless beacons transmitted by the beacon-transmitting wireless device. While operating in the active communication mode, the wakeup periods of the listening wireless device are separated in time by the same relatively short beacon transmit intervals used by the beacon-transmitting device.

Switching between the power saving mode and the active communication mode may be initiated by a beacon-transmitting wireless device or by a listening wireless device, depending upon the particular embodiment and/or its operating conditions. Indeed, a given embodiment may utilize various approaches and techniques to suit the needs of its application. The following sections describe different scenarios that involve switching between the operating modes. It should be appreciated that these different scenarios are merely exemplary, and that an embodiment of a wireless device may function in a different or modified manner than that specified here.

First Embodiment

Figure 4:
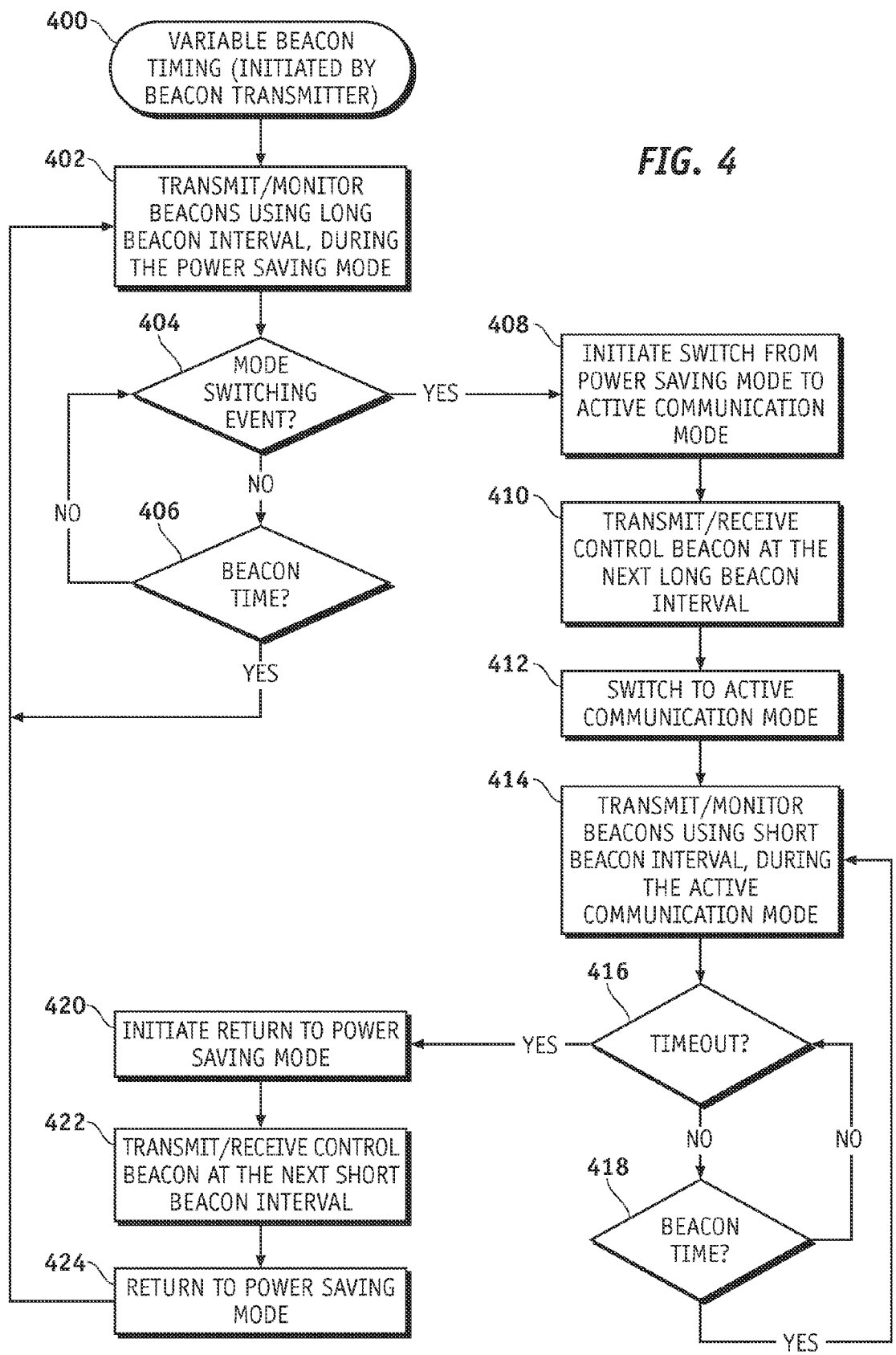
FIG. 4 is a flow chart that illustrates a first embodiment of a variable beacon timing process.

FIG. 4 is a flow chart that illustrates a first embodiment of a variable beacon timing process 400. For this embodiment of process 400, the beacon-transmitting wireless device initiates the transition from the power saving mode to the active communication mode. In addition, the wireless devices remain in the active communication mode for a fixed period of time before transitioning back to the power saving mode. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., the beacon-transmitting wireless device, the listening wireless device, or components thereof. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

Process 400 assumes that the wireless devices are initially operating in the power saving mode. Accordingly, the beacon-transmitting wireless device transmits beacons, and the listening wireless device monitors for beacons, in accordance with the power saving mode (task 402). As used here, "monitoring for a beacon" means that the listening wireless device readies itself to receive a beacon, whether or not it actually receives a beacon. In practice, the listening wireless device may power its wireless receiver for a brief time slot to prepare for an incoming beacon. In some embodiments, for example, the listening wireless device may change from its power saving mode to its active receive mode, and operate in its active receive mode for a designated time slot that is synchronized with the agreed upon beacon timing. Following the designated time slot, the listening wireless device returns to its power saving mode, where it remains until it is time to monitor for the next beacon. In certain embodiments, task 402 corresponds to: the beacon-transmitting wireless device periodically transmitting beacons to the listening wireless device at a first rate; and the listening wireless device periodically monitoring for beacons transmitted by the beacon-transmitting device at the first rate. As one non-limiting example, the first rate may correspond to a relatively low rate, such as once every eight seconds.

For this particular embodiment, the wireless devices will continue operating in the power saving mode until the beacon-transmitting wireless device generates or detects a mode switching event (query task 404), which may be any specified condition, action, input, command, or the like. A mode switching event may be associated with obtaining, at the beacon-transmitting wireless device, a user entry (e.g., the manipulation of a UI feature of the beacon-transmitting wireless device). As another example, a mode switching event may be associated with a prescheduled or stored event that will be performed by the beacon-transmitting wireless device. As yet another example, a mode switching event may correspond to the satisfaction of certain operating criteria, as determined by the beacon-transmitting wireless device. Moreover, a mode switching event may be associated with receiving, at the beacon-transmitting wireless device, a remote mode switching command from another wireless device. For example, referring to FIG. 2, listening wireless device 204 may generate and transmit a remote mode switching command for beacon-transmitting wireless device 202. The remote mode switching command can then be processed and interpreted by beacon-transmitting wireless device 202 in an appropriate manner, as described in more detail below.

If no mode switching event has been generated or detected by the beacon-transmitting wireless device (query task 404), then process 400 may check whether it is time to transmit and monitor for the next wireless beacon (query task 406). In certain embodiments, the beacon-transmitting wireless device will transmit the next wireless beacon, and the listening wireless device will monitor for the next wireless beacon, during a synchronized time slot that is governed by the relatively low beacon rate mentioned above. If query task 406 determines that it is time for the next beacon, then process 400 is re-entered at task 402 to handle the next beacon in the manner described previously. Thus, the loop defined by tasks 402, 404, and 406 is repeated to transmit and monitor for wireless beacons at the relatively low beacon rate, until query task 404 detects a mode switching event.

If a mode switching event is generated or detected by the beacon-transmitting wireless device (query task 404), then it will initiate a switch from the power saving mode to the active communication mode (task 408). In this regard, the beacon-transmitting wireless device initiates the transition to the active communication mode in response to the detected mode switching event. For this embodiment, the beacon-transmitting wireless device serves as the central device that controls when the wireless devices actually change operating modes. Accordingly, the beacon-transmitting wireless device generates and transmits a suitably formatted control beacon in accordance with the relatively low beacon rate, and the listening wireless device receives that control beacon in accordance with the relatively low beacon rate (task 410). In other words, the beacon-transmitting wireless device transmits the control beacon to the listening wireless device at the next beacon interval (i.e., a long time interval).

The control beacon is similar to other beacons in content, format, and configuration. However, the control beacon preferably conveys additional information and content. For example, the control beacon preferably conveys, indicates, or includes a mode switching command for the listening wireless device. In certain embodiments, the control beacon may also convey, indicate, or include a time period to be used by the listening wireless device. This time period represents the amount of time that the wireless devices will remain in the active communication mode (absent other influencing factors or commands). Including the time period in the control beacon may be optional for embodiments that employ a default or predetermined time period that is known a priori by the wireless devices.

The generation or transmission of the control beacon will prompt the beacon-transmitting wireless device to switch from the power saving mode to the active communication mode (task 412). Assuming that the listening wireless device receives the control beacon and the mode switching command contained in the control beacon, it will respond by switching from the power saving mode to the active communication mode (task 412). The listening wireless device can acknowledge in a subsequent message that the mode switching request was received, although receipt would be implied if the communication mode is switched to a new beacon interval. While operating in the active communication mode, the beacon-transmitting wireless device transmits beacons, and the listening wireless device monitors for beacons, in accordance with the active communication mode (task 414). In certain embodiments, task 414 corresponds to: the beacon-transmitting wireless device periodically transmitting beacons to the listening wireless device at a second rate; and the listening wireless device periodically monitoring for beacons transmitted by the beacon-transmitting device at the second rate. As one non-limiting example, the second rate may correspond to a relatively high rate, such as once every two seconds.

In preferred embodiments, the first rate is lower than the second rate, which is desirable to extend the battery life of the wireless devices. In some implementations, the second rate is a multiple of the first rate. Using the above examples, the first rate is one beacon every eight seconds (i.e., 0.125 beacon/sec) and the second rate is one beacon every two seconds (i.e., 0.5 beacon/sec). Thus, the second rate is four times the first rate for this example.

While operating in the active communication mode, the wireless device may exchange data using one or more wireless links or channels, as appropriate to the particular embodiment. In addition, the beacon-transmitting wireless device will continue to transmit beacons at the relatively high rate, and the listening wireless device will continue to monitor for beacons at the relatively high rate. This embodiment of process 400 assumes that the wireless devices will remain in the active communication mode for a time period that is known to the wireless devices. As mentioned above, this time period may be a predetermined, fixed, and default time period, or it may be a time period that is configurable and conveyed in the control beacon (described above for task 410). Accordingly, the wireless devices will continue operating in the active communication mode until the time period has elapsed. If the time period has not elapsed (query task 416), then process 400 may check whether it is time to transmit and monitor for the next wireless beacon (query task 418). While in the active communication mode, the beacon-transmitting wireless device will transmit the next wireless beacon, and the listening wireless device will monitor for the next wireless beacon, at the relatively high beacon rate mentioned above. If query task 418 determines that it is time for the next beacon, then process 400 is re-entered at task 414 to handle the next beacon in the manner described previously. Thus, the loop defined by tasks 414, 416, and 418 is repeated to transmit and monitor for wireless beacons at the relatively high beacon rate, until query task 416 determines that the designated time period has elapsed.

When the time period elapses, the beacon-transmitting wireless device will initiate a return to the power saving mode from the active communication mode (task 420). In this regard, the beacon-transmitting wireless device may generate and transmit a suitably formatted control beacon in accordance with the relatively high beacon rate, and the listening wireless device receives that control beacon in accordance with the relatively high beacon rate (task 422). In other words, the beacon-transmitting wireless device transmits this control beacon to the listening wireless device at the next beacon interval (i.e., a short time interval) after the timeout.

The second control beacon is similar to the first control beacon described above with reference to task 410. However, the second control beacon preferably conveys, indicates, or includes a mode changing/return command for the listening wireless device. The generation or transmission of the second control beacon will prompt the beacon-transmitting wireless device to return to the power saving mode (task 424). Assuming that the listening wireless device receives the second control beacon and the mode changing command contained in the second control beacon, it will respond by returning to the power saving mode for compatibility with the beacon-transmitting wireless device (task 424). As mentioned previously, the listening wireless device can acknowledge in a subsequent message that the mode switching request was received, although receipt would be implied if the communication mode is actually switched back. In this regard, FIG. 4 depicts task 424 leading back to task 402, which is associated with the relatively low beacon rate.

The above description of process 400 refers to relatively low and relatively high beacon rates. Equivalently, during the power saving mode the beacon-transmitting wireless device may transmit beacons in accordance with a first time schedule, and the listening wireless device may monitor for beacons in accordance with the first time schedule. In such an embodiment, during the active communication mode the beacon-transmitting wireless device transmits beacons in accordance with a second time schedule, and the listening wireless device monitors for beacons in accordance with the second time schedule. The first time schedule would mandate a first number of transmitted beacons for a given unit of time (regardless of whether the transmissions are periodic or made at regular intervals), and the second time schedule would mandate a second number of transmitted beacons for the same unit of time (regardless of whether the transmissions are periodic or made at regular intervals). Consistent with the above description, the first time schedule would require less transmitted beacons per unit of time, relative to the second time schedule. In another equivalent embodiment, during the power saving mode beacons are transmitted/monitored in accordance with a relatively long beacon interval. In contrast, during the active communication mode beacons are transmitted/monitored in accordance with a relatively short beacon interval. In all of the different embodiments, the amount of energy needed to transmit and listen for wireless beacons during the power saving mode is less than the amount of energy needed to transmit and listen for wireless beacons during the active communication mode, assuming the message length or total transmission time remains the same.

Second Embodiment

FIG. 5 is a flow chart that illustrates a second embodiment of a variable beacon timing process 500. For this embodiment of process 500, the listening wireless device (i.e., the beacon-receiving wireless device) initiates the transition from the power saving mode to the active communication mode. In addition, the wireless devices remain in the active communication mode until certain conditions are met. The various tasks performed in connection with process 500 may be performed by software, hardware, firmware, or any combination thereof. For illustrative purposes, the following description of process 500 may refer to elements mentioned above in connection with FIGS. 1-3. In practice, portions of process 500 may be performed by different elements of the described system, e.g., the beacon-transmitting wireless device, the listening wireless device, or components thereof. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, some of the tasks included in process 500 are identical or similar to counterpart tasks included in process 400 (FIG. 4). For the sake of brevity, such common tasks, features, and characteristics will not be redundantly described here in the context of process 500.

Process 500 assumes that the wireless devices are initially operating in the power saving mode and are transmitting/monitoring wireless beacons using the relatively long beacon interval (task 502). For this particular embodiment, the wireless devices will continue operating in the power saving mode until the listening wireless device generates or detects a mode switching event (query task 504), which may be any specified condition, action, input, command, or the like, as described above for process 400. For example, a mode switching event may be associated with, without limitation: a user entry obtained at the listening wireless device; a prescheduled or stored event that will be performed by the listening wireless device; the satisfaction of certain operating criteria, as determined by the listening wireless device; receiving, at the listening wireless device, a remote mode switching command from another wireless device; or the like.

If no mode switching event has been generated or detected by the listening wireless device (query task 504), then process 500 determines whether it is time to transmit and monitor for the next wireless beacon (query task 506). If so, then process 500 is re-entered at task 502 to handle the next beacon in the manner described previously. Thus, the loop defined by tasks 502, 504, and 506 is repeated to transmit and monitor for wireless beacons at the relatively low beacon rate, until the listening wireless device detects a mode switching event (query task 504).

If a mode switching event is generated or detected by the listening wireless device (query task 504), then it will initiate a switch from the power saving mode to the active communication mode by generating and transmitting a suitably formatted control message to the beacon-transmitting wireless device (task 508). The control message is generated with appropriate content, data, and/or information that can be analyzed or processed by the beacon-transmitting wireless device. For this particular embodiment, the control message conveys a mode switching request that is intended for the beacon-transmitting wireless device. This description of process 500 assumes that the beacon-transmitting wireless device receives the control message and then processes the control message and the associated mode switching request (task 510). In practice, the beacon-transmitting wireless device can process or analyze the mode switching request in an appropriate manner and, in response thereto, proceed with the mode switching procedure described below.

For this embodiment, the listening wireless device automatically and independently changes its operating mode in response to the mode switching event. In practice, the listening wireless device can change modes upon transmitting the control message (task 508) to the beacon-transmitting wireless device. Accordingly, in response to the mode switching request, the wireless devices can then switch to the active communication mode (task 514) and transmit/monitor wireless beacons at the relatively high beacon rate (task 516). Tasks 514 and 516 are similar to respective tasks 412 and 414, described previously in the context of process 400. In an alternate embodiment, the beacon-transmitting wireless device could serve as a central device that regulates when the wireless devices actually change operating modes. In such an embodiment, the beacon-transmitting wireless device generates and transmits a suitably formatted control beacon in accordance with the relatively low beacon rate, and the listening wireless device receives that control beacon in accordance with the relatively low beacon rate. This control beacon serves as a confirmation "trigger" for the listening wireless device, and the listening wireless device will actually switch modes in response to the control beacon (rather than automatically as described above).

This embodiment of process 500 assumes that the wireless devices will remain in the active communication mode until another mode switching event has been generated or detected by a listening wireless device (query task 518). Although not shown in FIG. 5, switching back to the power saving mode may instead be initiated by the beacon-transmitting device. The mode switching event may satisfy any criteria, as mentioned previously for query task 504. If a mode switching event does not occur (query task 518), then process 500 may check whether it is time to transmit and monitor for the next wireless beacon (query task 520). If query task 520 determines that it is time for the next beacon, then process 500 is re-entered at task 516 to handle the next beacon in the manner described previously. Thus, the loop defined by tasks 516, 518, and 520 is repeated to transmit and monitor for wireless beacons at the relatively high beacon rate, until query task 518 determines that a mode switching event has occurred.

If query task 518 detects a mode switching event, the listening wireless device will initiate a return to the power saving mode by generating and transmitting an appropriately formatted control message to the beacon-transmitting wireless device (task 522). This control message is generated with appropriate content, data, and/or information that can be analyzed or processed by the beacon-transmitting wireless device. For this particular embodiment, the control message conveys a mode restoring request that is intended for the beacon-transmitting wireless device. This description of process 500 assumes that the beacon-transmitting wireless device receives the control message and then processes the control message and the associated mode restoring request (task 524). In practice, the beacon-transmitting wireless device can process or analyze the mode restoring request in an appropriate manner and, in response thereto, proceed with the mode switching procedure described below.

The generation and transmission of the control message (task 522) causes the listening wireless device to automatically switch back to the power saving mode. In addition, the processing of the mode restoring request by the beacon-transmitting wireless device (task 524) will prompt the beacon-transmitting wireless device to switch/return to the power saving mode (task 528). Thus, the beacon-transmitting wireless device will be compatible with the listening wireless device, since both will now be in the power saving mode. In this regard, FIG. 5 depicts task 528 leading back to task 502, which is associated with the relatively long beacon interval.

In an alternate embodiment (not depicted in FIG. 5), the beacon-transmitting wireless device responds to the mode restoring request by generating and transmitting a suitably formatted control beacon, and the listening wireless device receives that control beacon. This subsequent control beacon functions to control when the listening wireless device actually switches back to the power saving mode.

Third Embodiment

FIG. 6 is a flow chart that illustrates a third embodiment of a variable beacon timing process 600. For this embodiment of process 600, the listening wireless device (i.e., the beacon-receiving wireless device) initiates the transition from the power saving mode to the active communication mode. In addition, the wireless devices remain in the active communication mode for a designated period of time, which can be refreshed or reset as needed. The various tasks performed in connection with process 600 may be performed by software, hardware, firmware, or any combination thereof. For illustrative purposes, the following description of process 600 may refer to elements mentioned above in connection with FIGS. 1-3. In practice, portions of process 600 may be performed by different elements of the described system, e.g., the beacon-transmitting wireless device, the listening wireless device, or components thereof. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. Moreover, some of the tasks included in process 600 are identical or similar to counterpart tasks included in process 400 (FIG. 4) and/or process 500 (FIG. 5). For the sake of brevity, such common tasks, features, and characteristics will not be redundantly described here in the context of process 600.

Tasks 602-616 are similar or identical to respective tasks 502-516, described above with reference to process 500. Upon completion of task 616, the wireless devices will be operating in the active communication mode. However, in contrast to process 500 (which returns to the power saving mode in response to the detection of certain mode switching events), process 600 employs a timeout routine similar to that used by process 400. In particular, this embodiment of process 600 assumes that the wireless devices will remain in the active communication mode for at least one time period that is known to the wireless devices. As mentioned above in the description of process 400, this time period may be a predetermined, fixed, and default time period, or it may be a time period that is configurable and conveyed in the control beacon associated with task 608. Accordingly, the wireless devices will continue operating in the active communication mode until the time period has elapsed. If the time period has not elapsed (query task 618), then process 600 may check whether it is time to transmit and monitor for the next wireless beacon (query task 620). If query task 620 determines that it is time for the next beacon, then process 600 is re-entered at task 616 to handle the next beacon in the active communication mode.

If it is not time for the next beacon (query task 620), then process 600 may check whether a mode refresh control message has been received by the beacon-transmitting wireless device (query task 622). A mode refresh control message can be similar in format and content to the control message associated with task 608. In this regard, a mode refresh control message preferably conveys a mode switching request that instructs the beacon-transmitting wireless device to switch from the power saving mode to the active communication mode. In practice, since the beacon-transmitting wireless device is capable of receiving mode control messages from a plurality of different listening wireless devices, one listening wireless device might send a mode switching request to the beacon-transmitting wireless device when the beacon-transmitting wireless device is already in the active communication mode. Query task 622 and the use of the term "mode refresh" for such control messages contemplates such a scenario. In an alternate embodiment that supports more than two different modes (e.g., a power saving mode, a normal active mode, and a fast active mode), process 600 could be modified to accommodate mode refresh control messages initiated by different listening wireless devices. For example, if the beacon-transmitting wireless device receives a control message that indicates a mode that is "faster" than its current mode, then the beacon-transmitting device will switch to the new mode.

Referring again to query task 622, if a mode refresh control message has not been received by the beacon-transmitting wireless device, then process 600 is re-entered at query task 618. On the other hand, if a mode refresh control message has been processed, then the active communication mode time period can be reset (task 624), adjusted, or extended as needed to accommodate the mode switching request conveyed in the mode refresh control message. After resetting the time period, process 600 can be re-entered at task 616 to continue operating in the active communication mode. Thus, the loop defined by tasks 616, 618, 620, 622, and 624 results in the transmission and monitoring of beacons at the relatively high beacon rate until the active communication mode times out (query task 618). Notably, the duration of the active communication mode can be extended as needed to accommodate ongoing mode switching requests.

When the time period elapses (query task 618), the beacon-transmitting wireless device will initiate a return to the power saving mode. For this embodiment of process 600, the beacon-transmitting wireless device generates and transmits a suitably formatted control beacon at the next short beacon interval, and the listening wireless device receives that control beacon at the next short beacon interval (task 626). As described previously, this control beacon conveys, indicates, or includes a mode restoring command for the listening wireless device, and this control beacon will cause the wireless devices to return to the power saving mode (task 628). Accordingly, FIG. 6 depicts task 628 leading back to task 602, which is associated with operation in the power saving mode. In certain alternate embodiments, the listening wireless device could be suitably configured to maintain an independent timer and automatically switch back to the power saving mode when the designated time period ends. In such an alternate embodiment, the listening wireless device need not wait for a control beacon (task 626) before switching back to the power saving mode.

Variations

Although three exemplary embodiments are described above, an implementation of the variable beacon timing technique may include additional, alternative, or modified tasks, or it may omit one or more of the described tasks. Moreover, an implementation of the variable beacon timing methodology may represent a hybrid or a combination of any of the tasks described above for the three embodiments. Furthermore, although the embodiments described above focused on simple operating environments having one beacon-transmitting wireless device and one listening wireless device, a practical deployment need not be so limited and the processes described herein might be concurrently performed to support any number of wireless devices.

Depending upon the particular application, any wireless device (i.e., a beacon-transmitting wireless device, a listening wireless device, or another wireless device providing remote commands) might be responsible for generating or detecting a mode switching event that prompts a switch from the power saving mode to the active communication mode, or vice versa. For example, the beacon-transmitting wireless device and a first listening wireless device could switch modes in response to a mode switching event detected by a second listening wireless device (regardless of whether the second wireless device also switches modes). As another example, the wireless devices could switch to the active communication mode in response to a mode switching event detected by the listening wireless device, but return to the power saving mode in response to a different mode switching event detected by the beacon-transmitting wireless device.

Another option for the wireless system relates to the manner in which the active communication mode time period is set or determined. As mentioned above in connection with the description of process 400, in certain embodiments the time period may be fixed at a default value that is known a priori by the wireless devices. In other embodiments, the time period may be configurable and set using an appropriate field or data conveyed in the control messages and/or the control beacons. The configurable time period information can be designated by any wireless device in the system (i.e., a beacon-transmitting wireless device, a listening wireless device, or another wireless device that provides remote commands), and the time period can be conveyed in a control message or a control beacon transmitted by any wireless device in the system.

As yet another option, one or more of the wireless devices in the system could be suitably configured to return to the power saving mode automatically after certain conditions are met, after the designated time period has elapsed, after detecting a mode switching event, or the like. In other words, although the above embodiments utilize control beacons to command the listening wireless devices to return to the power saving mode, such control beacons need not be employed. For example, if a fixed time period is implemented, then the beacon-transmitting wireless device and the listening wireless device may automatically and independently return to the power saving mode after the time period ends.

In certain embodiments, a listening wireless device could be suitably configured to switch operating modes by itself and provide a notification of the switch to the beacon-transmitting wireless device, which can then react in an appropriate manner. For example, if a listening device detects or generates a mode switching event, then it could immediately change to the appropriate operating mode. At the next scheduled beacon interval, that listening wireless device can transmit a suitably formatted message to the beacon-transmitting wireless device; that message can include a mode switching or mode restoring request (as described above).

In practice, each listening wireless device can operate in an independent manner for purposes of switching between its power saving mode and its active communication mode. For example, assume that the beacon-transmitting wireless device and one listening wireless device are operating in the active communication mode. Those two devices will be synchronized to accommodate short beacon intervals. Other listening wireless devices in the system, however, need not be operating in their active communication modes. In other words, the other listening wireless devices can remain in the power saving mode and still be synchronized with the long beacon intervals. This characteristic assumes that the long beacon interval represents a multiple of the short beacon interval. Of course, each listening wireless device can change to the active communication mode as needed.

A system configured as described herein could support more than two (indeed, any number) different beacon intervals. Additional beacon intervals may be particularly desirable when more than two listening wireless devices are deployed. For example, the system may support a power saving mode (having a relatively long beacon interval), a normal operating mode (having a relatively intermediate beacon interval), and a fast operating mode (having a relatively short beacon interval). In a system having three or more different beacon intervals, the beacon-transmitting wireless device will be suitably configured to switch to a shorter beacon interval whenever it receives a mode change request (from any listening wireless device in the system or via an internal timer) that indicates an operating mode having a shorter beacon interval than that currently supported by the beacon-transmitting wireless device. On the other hand, if the beacon-transmitting wireless device receives a mode change request (from any listening wireless device in the system) that indicates an operating mode having a longer beacon interval than that currently supported by the beacon-transmitting wireless device, the beacon-transmitting wireless device will "queue" that mode change request and remain in the current mode until the designated time period for the current mode has elapsed. This behavior is desirable to ensure that the needs of the listening wireless device (or devices) utilizing the shorter beacon interval are satisfied before the beacon-transmitting wireless device switches modes.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A variable beacon timing method for a first wireless device and a second wireless device, the method comprising:
    periodically transmitting beacons from the first wireless device to the second wireless device at a first rate during a first operating mode;
    the first wireless device initiating a switch from the first operating mode to a second operating mode;
    transmitting a control beacon from the first wireless device to the second wireless device in accordance with the first rate, the control beacon conveying a mode switching command for the second wireless device;
    thereafter, periodically transmitting beacons from the first wireless device at a second rate during the second operating mode;
    while operating the first wireless device and the second wireless device in the second operating mode, the first wireless device receiving a control message from the second wireless device, wherein the control message is generated and transmitted by the second wireless device in response to the second wireless device detecting a mode switching event that occurs while operating the first wireless device and the second wireless device in the second operating mode, and wherein the control message conveys a second mode switching command for the first wireless device; and
    returning the first wireless device to the first operating mode in response to receiving the control message from the second wireless device.

2. The method of claim 1, wherein the first rate is lower than the second rate.

3. The method of claim 1, wherein the second rate is a multiple of the first rate.

4. The method of claim 1, wherein:
    the first operating mode represents a power saving mode; and
    the second operating mode represents an active communication mode.

5. The method of claim 1, further comprising obtaining a user entry at the first wireless device, wherein the initiating step is responsive to the user entry.

6. The method of claim 1, further comprising the first wireless device receiving a remote mode switching command from a third wireless device, wherein the initiating step is responsive to the remote mode switching command.

7. The method of claim 1, further comprising:
    after returning the first wireless device to the first operating mode, periodically transmitting beacons from the first wireless device at the first rate.

8. A variable beacon timing method for a first wireless device and a second wireless device, the method comprising:

transmitting beacons from the first wireless device to the second wireless device during a first operating mode and in accordance with a first time schedule;

the first wireless device receiving a control message from the second wireless device, the control message conveying a mode switching request;

thereafter, periodically transmitting beacons from the first wireless device during the second operating mode and in accordance with a second time schedule;

while operating the first wireless device and the second wireless device in the second operating mode, the first wireless device receiving a control message from the second wireless device, wherein the control message is generated and transmitted by the second wireless device in response to the second wireless device detecting a mode switching event that occurs while operating the first wireless device and the second wireless device in the second operating mode, and wherein the control message conveys a mode restoring request for the first wireless device; and returning the first wireless device to the first operating mode in response to receiving the control message from the second wireless device.

9. The method of claim 8, wherein:

the first time schedule mandates a first number of transmitted beacons for a unit of time;

the second time schedule mandates a second number of transmitted beacons for the unit of time; and the first number is less than the second number.

10. A variable beacon timing method for a first wireless device and a second wireless device, the method comprising:

periodically monitoring for beacons transmitted by the first wireless device at a first rate during a first operating mode, the beacons including a control beacon that conveys a mode switching command for the second wireless device;

receiving the control beacon and the mode switching command;

in response to the mode switching command, the second wireless device switching from the first operating mode to the second operating mode;

thereafter, periodically monitoring for beacons transmitted by the first wireless device at a second rate during the second operating mode;

the second wireless device detecting a mode switching event that occurs while operating the second wireless device in the second operating mode;

in response to detecting the mode switching event, the second wireless device transmitting a control message that conveys a mode restoring request for the first wireless device;

thereafter, returning the second wireless device to the first operating mode; and thereafter, periodically monitoring for beacons transmitted by the first wireless device at the first rate during the first operating mode.

11. The method of claim 10, wherein the first rate is lower than the second rate.

12. The method of claim 10, wherein the second rate is a multiple of the first rate.

13. The method of claim 10, wherein:

the first operating mode represents a power saving mode; and the second operating mode represents an active communication mode.

14. A variable beacon timing method for a first wireless device and a second wireless device, the method comprising:

monitoring for beacons transmitted by the first wireless device during a first operating mode and in accordance with a first time schedule;

transmitting a control message to the first wireless device, the control message conveying a mode switching request;

the second wireless device switching from the first operating mode to the second operating mode;

thereafter, monitoring for beacons transmitted by the first wireless device during the second operating mode and in accordance with a second time schedule;

the second wireless device detecting a mode switching event that occurs while operating the second wireless device in the second operating mode;

in response to detecting the mode switching event, the second wireless device transmitting a second control message that conveys a mode restoring command for the first wireless device;

thereafter, returning the second wireless device to the first operating mode; and thereafter, periodically monitoring for beacons transmitted by the first wireless device at the first rate during the first operating mode.

15. The method of claim 14, wherein:

the first time schedule mandates a first number of transmitted beacons for a unit of time;

the second time schedule mandates a second number of transmitted beacons for the unit of time; and the first number is less than the second number.

16. A system of wireless devices configured to wirelessly communicate with one another, the system comprising:

a beacon-transmitting wireless device configured to transmit, during a first operating mode, wireless beacons separated in time by relatively long time intervals, and configured to transmit, during a second operating mode, wireless beacons separated in time by relatively short time intervals; and a listening wireless device configured to listen, during the first operating mode, for wireless beacons transmitted by the beacon-transmitting wireless device, and configured to listen, during the second operating mode, for wireless beacons transmitted by the beacon-transmitting wireless device;

wherein the beacon-transmitting wireless device is configured to initiate switching from the first operating mode to the second operating mode by transmitting a control beacon to the listening wireless device, the control beacon being transmitted by the beacon-transmitting wireless device at a time corresponding to one of the relatively long time intervals; and wherein the listening wireless device is configured to initiate switching from the second operating mode to the first operating mode by detecting a mode switching event that occurs while operating the beacon-transmitting wireless device and the listening wireless device in the second operating mode, and, in response to detecting the mode switching event, transmitting a mode restoring request to the beacon-transmitting wireless device.

17. The system of claim 16, wherein:

the first operating mode represents a power saving mode; and the second operating mode represents an active communication mode.

* * * * *